United States Patent
Polston et al.

(10) Patent No.: US 8,560,411 B2
(45) Date of Patent: Oct. 15, 2013

(54) COMPUTERIZED SYSTEM FOR MANAGING COMMUNICATIONS BETWEEN A BUYER, SELLER, AND LENDER

(75) Inventors: Stephen M. Polston, Excelsior, MN (US); Aaron Matthew Vennie, Burnsville, MN (US); Jeffery Matthew Colville, Maple Grove, MN (US); Michelle Patrice Hiller, Rockford, MN (US); Joan Marie Skallman, Excelsior, MN (US); Ronald J. Steele, Clear Lake, WI (US); Michael K. Ross, Eden Prairie, MN (US)

(73) Assignee: Preferred Home Buyers Network, Inc., Excelsior, MN (US)

( * ) Notice: Subject to any disclaimer, the term of this patent is extended or adjusted under 35 U.S.C. 154(b) by 1609 days.

(21) Appl. No.: 11/403,385

(22) Filed: Apr. 12, 2006

(65) Prior Publication Data

US 2006/0184448 A1     Aug. 17, 2006

Related U.S. Application Data

(63) Continuation-in-part of application No. 10/187,207, filed on Jul. 1, 2002.

(60) Provisional application No. 60/359,804, filed on Feb. 26, 2002.

(51) Int. Cl.
*G06Q 40/00*     (2012.01)

(52) U.S. Cl.
USPC ............................................................. 705/35

(58) Field of Classification Search
USPC ..................................................... 705/30–45
See application file for complete search history.

(56) References Cited

U.S. PATENT DOCUMENTS

| | | | |
|---|---|---|---|
| 5,032,989 A | 7/1991 | Tornetta | |
| 5,584,025 A * | 12/1996 | Keithley et al. | ............... 707/752 |
| 5,664,115 A | 9/1997 | Fraser | |
| 5,754,850 A | 5/1998 | Janssen | |
| 5,794,216 A | 8/1998 | Brown | |
| 5,995,947 A | 11/1999 | Fraser et al. | |
| 6,236,977 B1 | 5/2001 | Verba et al. | |
| 6,321,202 B1 | 11/2001 | Raveis, Jr. | |
| 6,484,176 B1 | 11/2002 | Sealand et al. | |
| 6,519,618 B1 | 2/2003 | Snyder | |

(Continued)

OTHER PUBLICATIONS

Office Action dated Mar. 3, 2010, U.S. Appl. No. 10/187,207, Polston et al.

(Continued)

*Primary Examiner* — Thomas M Hammond, III
(74) *Attorney, Agent, or Firm* — Beck & Tysver, PLLC

(57) ABSTRACT

A computerized system and method are presented for exchanging information between a buyer, a seller, and a lender. The system permits sellers and lenders to input buyers that are then submitted for activation. The buyers use the system to obtain information about items, while the sellers and lenders make consistent contact with the buyer in order to work with the buyer. Information about the buyers is shared with both the sellers and the lenders. A business plan is also input into the computerized system by the financial institution employing the lender. This business plan includes goals for numbers of sellers and buyers using the system, and for loan officer candidates to be recruited. Activity on the computerized system is calculated for compliance with the business plan. Feedback is provided to management relating to whether the business plan is being met.

15 Claims, 14 Drawing Sheets

(56) References Cited

U.S. PATENT DOCUMENTS

| | | |
|---|---|---|
| 6,594,633 B1 | 7/2003 | Broerman |
| 6,678,663 B1 | 1/2004 | Mayo |
| 6,684,196 B1 | 1/2004 | Mini et al. |
| 6,871,140 B1 | 3/2005 | Florance et al. |
| 6,883,002 B2 | 4/2005 | Faudman |
| 6,973,432 B1 | 12/2005 | Woodard et al. |
| 6,985,886 B1 * | 1/2006 | Broadbent et al. ............ 705/38 |
| 7,016,866 B1 | 3/2006 | Chin et al. |
| 2001/0032175 A1 | 10/2001 | Holden et al. |
| 2002/0029194 A1 * | 3/2002 | Lewis et al. .................... 705/39 |
| 2002/0035520 A1 | 3/2002 | Weiss |
| 2002/0046077 A1 | 4/2002 | Mozayeny et al. |
| 2002/0049624 A1 | 4/2002 | Ravels |
| 2002/0052814 A1 | 5/2002 | Ketterer |
| 2002/0059137 A1 | 5/2002 | Freeman et al. |
| 2002/0069151 A1 | 6/2002 | Casper |
| 2002/0077893 A1 | 6/2002 | Wolf et al. |
| 2002/0095385 A1 | 7/2002 | McAvoy et al. |
| 2003/0101063 A1 | 5/2003 | Sexton et al. |
| 2003/0187756 A1 | 10/2003 | Klivington |
| 2004/0030631 A1 | 2/2004 | Brown et al. |
| 2004/0143450 A1 | 7/2004 | Vidali |
| 2009/0198546 A1 * | 8/2009 | Earle et al. ..................... 705/7 |

OTHER PUBLICATIONS

Office Action dated Jan. 31, 2007, U.S. Appl. No. 10/187,207, Polston et al.
Office Action dated Nov. 13, 2007, U.S. Appl. No. 10/187,207, Polston et al.
Advisory Office Action dated May 2, 2008, U.S. Appl. No. 10/187,207, Polston et al.
Office Action dated May 27, 2009, U.S. Appl. No. 10/187,207, Polston et al.
Office Action dated Mar. 1, 2010, U.S. Appl. No. 11/999,299, Polston et al.
Office Action dated Sep. 17, 2010, U.S. Appl. No. 11/999,299, Polston et al.
Office Action dated Oct. 11, 2011, U.S. Appl. No. 12/768,137, Polston et al.
Office Action dated Feb. 2, 2011, U.S. Appl. No. 10/187,207, Polston et al.

* cited by examiner

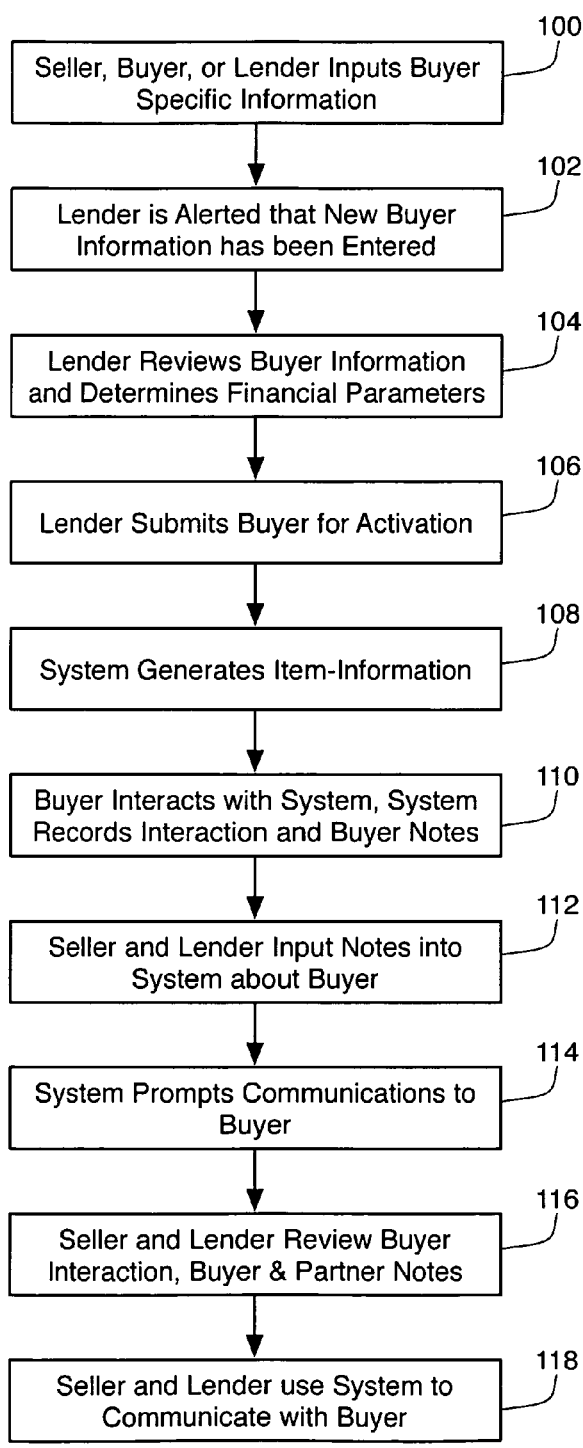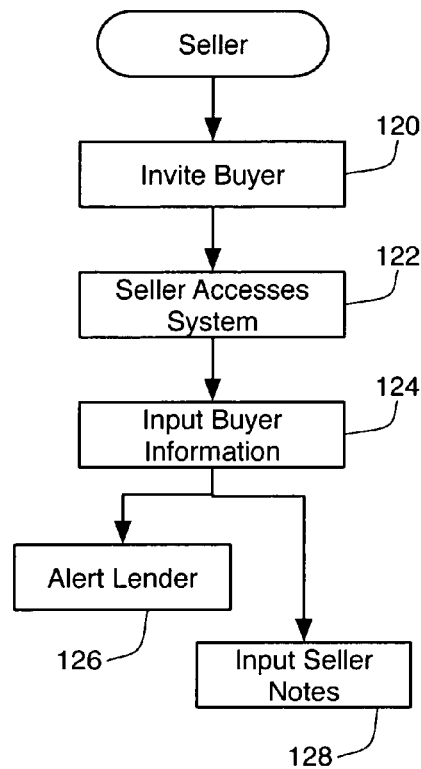

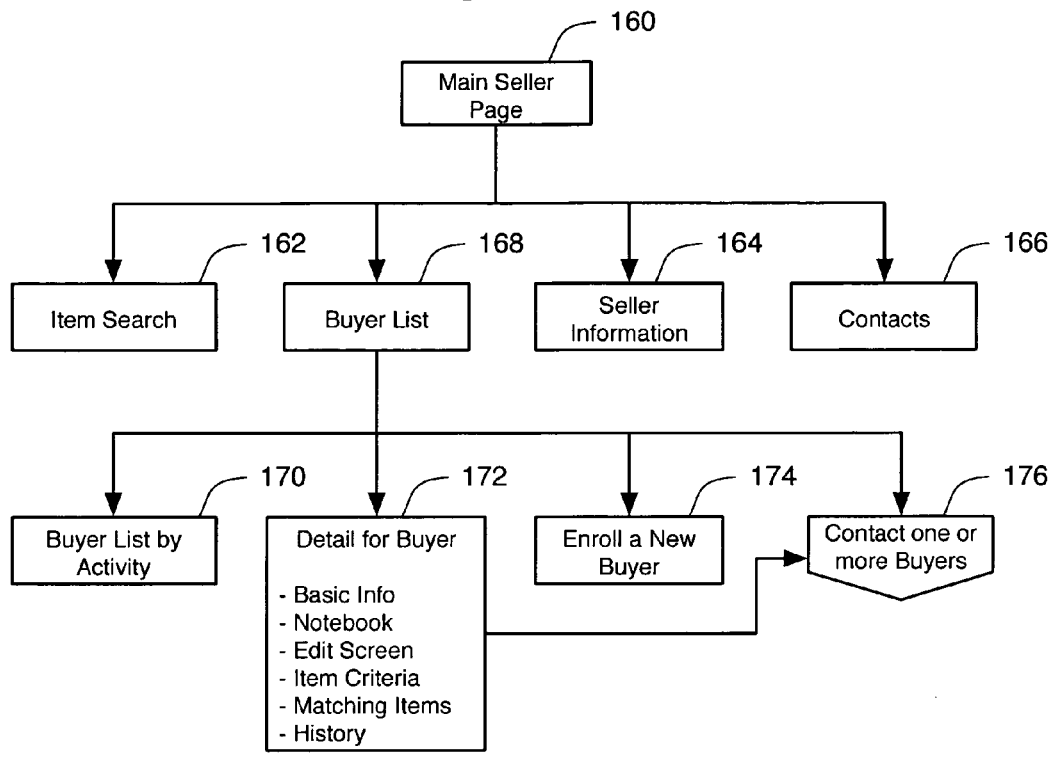
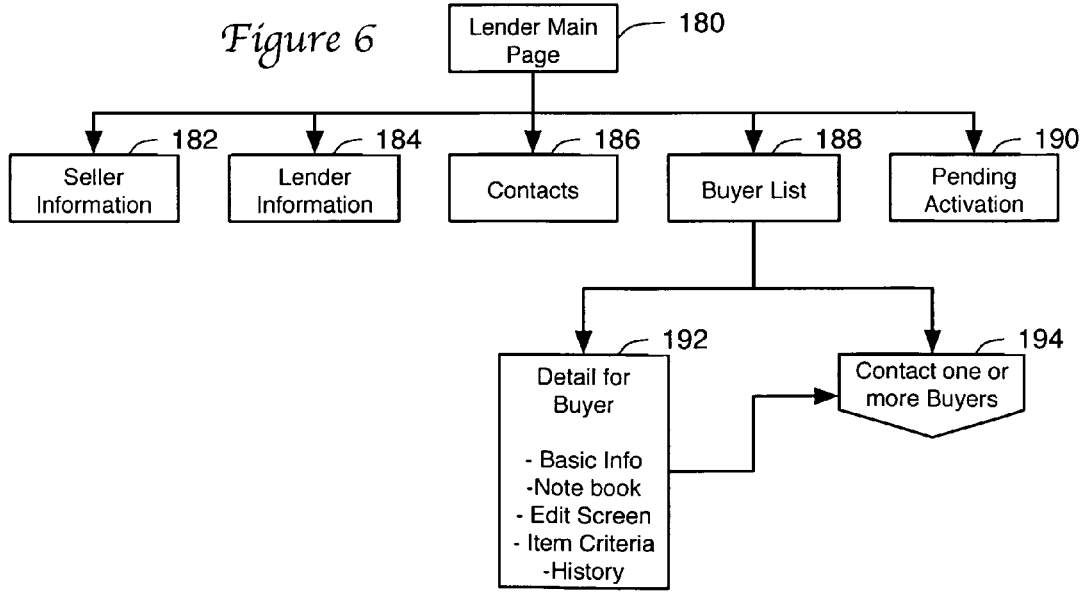

Figure 13

Lender/Loan Officer List — 510

Filter By: — 512

Select All — 524    Broadcast E-mail — 516

| Name | Branch | Contact Info | Enroll Date | Buyer Count | Buyer Pipeline ($K) | Seller Count | Links |
|---|---|---|---|---|---|---|---|
| ☐ John Ho | First | john@lo.com | 11/04 | 23 | 32342 | 8 (6I2) | X √ Δ ◊ |
| ☐ Lisa Smith | First | lisa@lo.com | 2/05 | 0 | 0 | 1 (1I0) | X √ Δ ◊ |
| ☐ Juan Diaz | Second | juan@lo.com | 6/05 | 15 | 21050 | 4 (2I2) | X √ Δ ◊ |
| ☐ Abdul Rahim | Second | abdul@lo.com | 11/05 | 11 | 16050 | 2 (2I0) | X √ Δ ◊ |

Figure 14

Seller List — 520

Filter By: — 522

Select All — 524    Broadcast E-mail — 526

| Name | Employer | Contact Info | Enroll Date | Buyer Count | Buyer Pipeline ($K) | Loan Officer | Links |
|---|---|---|---|---|---|---|---|
| ☐ Liz Cook | Main St. RE | liz@msre.com | 7/05 | 8 | 8200 | Juan Diaz | X √ Δ ◊ |
| ☐ Frank Wang | Main St. RE | frank@msre.com | 8/05 | 3 | 6050 | Juan Diaz | X √ Δ ◊ |
| ☐ Sue Vega | Uptown RE | sue@uptownre.com | 7/05 | 1 | 1000 | Juan Diaz | X √ Δ ◊ |
| ☐ Amir Lee | River RE | amir@riverre.com | 11/05 | 3 | 5800 | Juan Diaz | X √ Δ ◊ |

COMPUTERIZED SYSTEM FOR MANAGING COMMUNICATIONS BETWEEN A BUYER, SELLER, AND LENDER

CLAIM OF PRIORITY

This application is a continuation-in-part of U.S. patent application Ser. No. 10/187,207, filed on Jul. 1, 2002 and which claimed priority to U.S. Provisional Patent Application No. 60/359,804, which was filed Feb. 26, 2002 and was entitled "Home Buyer Contact Conversion System and Method."

FIELD OF THE INVENTION

The present invention relates to the field of automating real estate sales contacts. More particularly, the present invention relates to a system for managing loan officers and lending institutions that participate in an automated system for communicating between a buyer, a seller, and a lender.

BACKGROUND OF THE INVENTION

Typical real estate related web sites of the prior art provide for real time home searches based on a set of input search criteria. In addition, many provide answers to frequently asked questions and general information about home buying and home mortgages. The purpose of these web sites is to function as client development tools for real estate agents. Such sites do not typically provide meaningful interaction between a buyer and an individual agent, and such sites do not provide for meaningful follow-up from the agent. Furthermore, such sites may provide basic financing information, but are mainly operated from the perspective of the agent. No effort is made to integrate the lender, or to allow the lender, the agent, or any other party to monitor a buyer's activities while assisting with contact management of the potential buyers.

A method of providing information to a real estate buyer exists in the prior art that does allow some interaction between a buyer, a seller, and a lender. However, this prior art method is not computerized. In this method, the real estate agent takes information from a buyer regarding the buyer's preferences for purchasing a home and the buyer's contact information. The agent then provides this information to a lender. The lender will then certify the buyer based on the buyer's purchasing ability and forward the buyer's preferences and authorized price range to an administrator who manages a network of lenders. Based on this information, the administrator mails the buyer a listing of homes within the buyer's price range and matching the buyer's preferences. The administrator follows-up with the buyer, as does the agent and the lender. Contact is made typically in person, over the telephone, and through the mail. The administrator prompts the agent and lender to contact the buyer periodically by sending them a list of contact information that includes a suggestion as to which prospective buyer should be contacted by them at that time. No automated method exists that allows buyers to access real estate information while further providing an automated ability for a buyer, seller, and lender to communicate with each other.

SUMMARY OF THE INVENTION

The present disclosure is directed to a computerized system and method for exchanging information between a buyer, a seller and lender. The present system and method permits a seller to enroll buyers and easily focus sales efforts at buyers who might not yet be ready to purchase. The system and method seamlessly integrate lenders, permitting lenders to participate earlier in the buying process. Also, the system and method helps educate and develop buyers, and provides for more personalized contacts with the lender and the seller even during the earlier stages of the buying process. Finally, the system and method allows managers to track the performance of those entities and individuals that they manage against the business plan.

A computerized method for exchanging information between a buyer, seller and lender is disclosed. The computerized method shares buyer-specific information between the seller and the lender. Such information can include buyer-specific preferences, and notes about and impressions of the buyer. The computerized system also generates item-information for the buyer based on the buyer-specific information. The item information can include a list of items meeting the buyer-specific preferences and a detailed description of each item on the list. The seller and lender work together to determine the buyer-specific information and to develop a range of items the buyer can afford. The computerized system also monitors buyer activity related to the item information. For example, the seller and lender are able to view, based on the buyer's use of the computerized system, what items have caught the interest of the buyer. The seller and lender are able to focus their efforts based on this information. Also, the computerized system manages seller and lender contacts with the buyer. For example, through a series of prompts, the seller and lender are alerted as to when to contact the buyer for follow-up based on information such as buyer's activity. In so doing, the system helps the seller and lender manage contacts with the buyer to help eliminate redundant communication and to move the buying process forward.

Financial institution managers are able to track whether individual lenders are fulfilling their obligations relating to client contacts. Furthermore, these managers are also to determine the performance of a branch or organization as it relates to certain goals that have been established as part of business model or planning tool. Finally, managers of sellers or real estate agents are able to compare the performance of those sellers against goals established by the seller organization.

BRIEF DESCRIPTION OF THE DRAWINGS

FIG. 2 is a flow chart of a method for exchanging information within the system of FIG. 1.

FIG. 3 is a flow chart of seller activities for inputting a buyer into the system of FIG. 1.

FIG. 5 is a block diagram of a seller interface into the system of FIG. 1.

FIG. 6 is a block diagram of a lender interface into the system of FIG. 1.

FIG. 13 is a block diagram of a lender list that is shown in FIG. 11.

FIG. 14 is a block diagram of a seller list that is shown in FIG. 11.

DETAILED DESCRIPTION OF THE INVENTION

Basic Configuration

Figure 1:
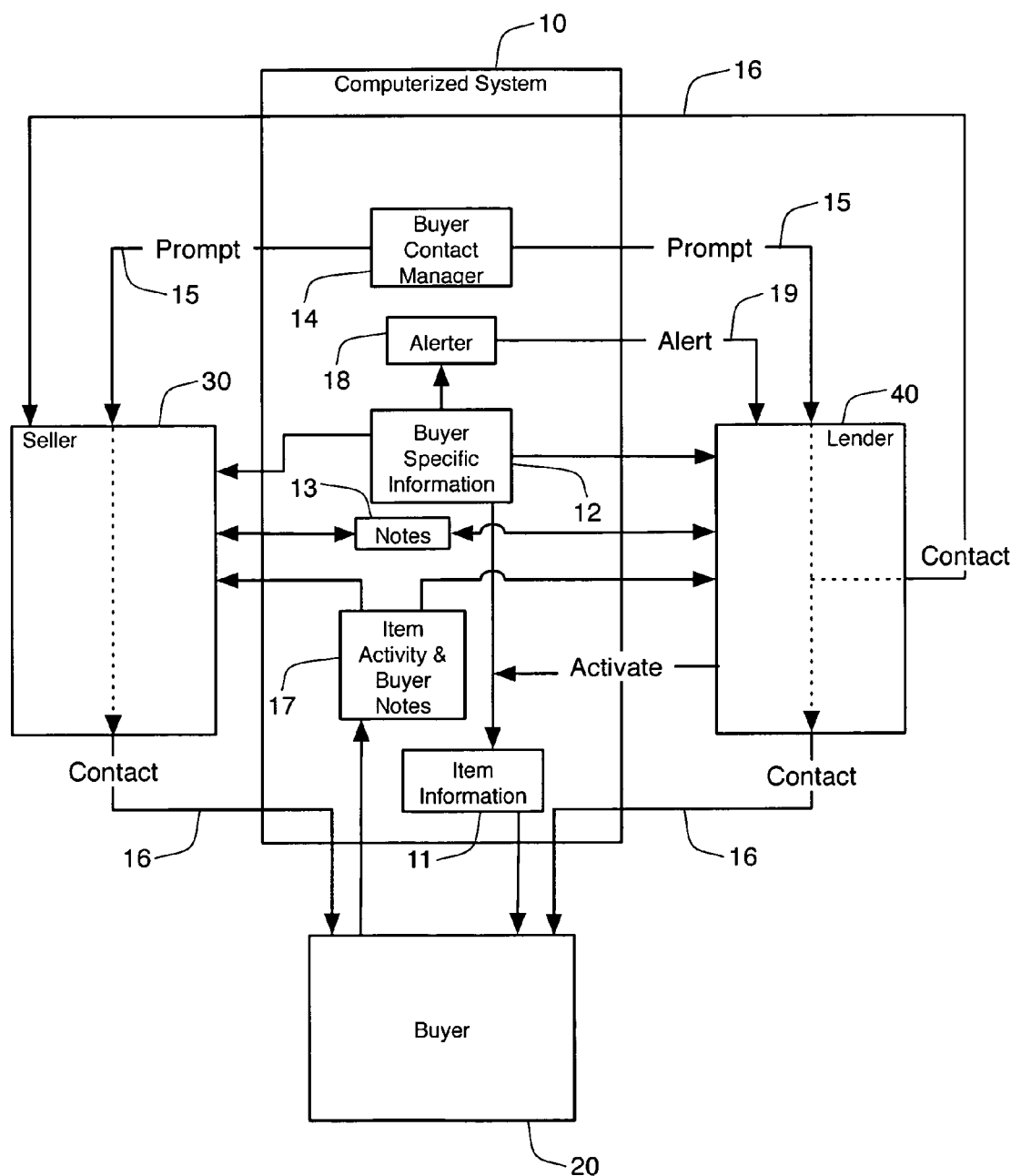
FIG. 1 is a block diagram of the computerized system of the present invention and its communications with a buyer, a seller, and a lender.

FIG. 1 shows a block diagram showing a buyer 20, seller 30, and lender 40 that are connected through a computerized system 10. The buyer 20 can include anyone generally interested in an item, regardless of whether that person or entity will actually acquire or own the item. Examples of a buyer 20 can include an individual actually interested in acquiring the item to be sold, an individual merely curious about the item, a representative of an individual who is interested in acquiring the item to be sold, and so on. Similarly, the seller 30 in the context of this disclosure has broad meaning and can include anyone who furnishes the buyer 20 with the opportunity to purchase the item. Examples of a seller 30 can include the current owner of the item, a representative or agent of the owner such as a real estate agent, someone such as a buyer's representative, who provides the buyer with the opportunity to purchase the item, or the like. A lender 40 is anyone who can provide access to funds, whether it is for debt or equity. Examples include banks, loan officers, venture capitalists, or the like.

In the embodiment described below, the seller is generally considered a real estate agent, the buyer is a prospective purchaser of real property, and the lender is a loan officer. Other examples are contemplated such as a car salesperson, finance or leasing company, and prospective car purchaser. In still further embodiments, the role of the seller is fulfilled by a building construction contractor who sells new home construction services to a buyer. Alternatively, the role of the lender can be replaced with an entity that can provide a service to a buyer that is about to buy an item from the seller. One example could be a home inspector that provides inspection services to a new homebuyer. Of course, the scope of the invention is not limited to the disclosed examples, but rather is defined by the appended claims.

The computerized system 10 includes a set of instructions and/or interfaces embodied on a computer readable medium for execution on a digital processor. One example is a computer program stored on a memory device, such as a hard drive or some form of programmable read only memory device. This example also includes at least one processor for operating the computer program. Alternatively, the computerized system 10 could be a network of computers all operating according to the instructions of the computer program. The buyer 20, seller 30, and lender 40 preferably communicate with the computerized system 10 through a wide area network such as the Internet. The communication protocol used for these communications can take a variety of forms, such as the use of HTML or ASP documents over HTTP and HTTPS, as is standard for ordinary web communications. The buyer 20, seller 30, and lender 40 will preferably connect to the computerized system 10 through their own digital devices, which may include personal computers, personal digital assistants, wireless telephones, and other devices with the capability of linking to a network and accessing the program. In the preferred embodiment, the computerized system 10 is established using a web server, and the buyer 20, seller 30, and lender 40 communicate with the system 10 using web browsers operating over the Internet.

In the relationship contemplated by FIG. 1, the buyer 20 is invited to use the computerized system 10 to access information about an item or item that they wish to purchase. In the preferred embodiment, the item is real property, such as a single family home, a condominium, a business structure, or an undeveloped piece of real estate. The invitation to use the computerized system 10 preferably comes from the seller 30 or lender 40 who both participate in the utilization of the computerized system 10. The purpose of the computerized system 10 is to provide item information 11 to the buyer 20 based upon buyer specific information 12 stored in the system 10. At the same time, the system 10 allows the seller 30 and the lender 40 to simultaneously monitor and assist the buyer 20 in his or her use of the system 10. For example, the seller 30 is able to correspond with the buyer 20 and lender 40 through the computerized system 10, and to share notes 13 regarding the buyer 20 with the lender 40. Similarly, the lender 40 can contact the buyer 20 and the seller 30 and share notes 13 with the seller 30. The buyer 20 is able to contact the seller 30 and lender 40, either to request information from each, or provide information to each.

In the preferred embodiment, each buyer 20 will be invited to participate in the system 10 by a seller 30. The seller 30 then alerts the buyer 20 that information about a particular lender 40 will be presented to them during their use of the system 10. Alternatively, the buyer 20 could be invited to use the system 10 by a lender 40. Either way, each buyer 20 in the system is usually associated with a single seller 30 and a single lender 40. As the buyer 20 uses the system, the seller 30 and lender 40 will both stay in communication with the buyer 20 to help them use the system 10, to make decisions about the buyer's financial ability to purchase an item, and to complete an item purchase. The purpose of this communication is to help encourage that when the buyer 20 makes an item purchase decision, the buyer 20 will use the seller 30 and/or the lender 40 to complete the purchase. The primary benefit of the system 10 is to maintain this contact with potential buyers 20 and thereby increase the number of buyers 20 that use their services.

To manage the communications between the buyer 20, seller 30, and lender 40, the system 10 uses a buyer contact manager component 14 to monitor all communications with the buyer 20 made by either the seller 30 or the lender 40. This contact manager 14 can ensure that the buyer 20 receives regular communication from both the seller 30 and the lender 40. In the preferred embodiment, the buyer contact manager 14 provides prompts 15 to the seller 30 and the lender 40 to make contact 16 with the buyer 20 on a weekly basis. To avoid overwhelming the buyer 20, the system 10 prompts only one of the sellers 30 and lenders 40 on a given week, and then prompts the other on the next week. In this way, the buyer 20 will receive communications only once per week, and the seller 30 and lender 40 will be prompted when it is their turn to make the communication. While the preferred embodiment ensures this alternating, weekly communication, other timing and sharing parameters would be within the scope of the present invention. In addition to prompting about communications with the buyer 20, the system 10 is able to periodically prompt lenders 40 to make contact 16 with sellers 30. These types of lender-seller contacts 16 assist in creating a good working relationship between lenders 40 and sellers 30.

In addition to prompting the communication, the computerized system 10 can provide the means to make the actual communication or contact 16 with the buyer 20. This communication 16 may take place through standard Internet e-mail protocols, or can be accomplished through a messaging system that remains internal to the computerized system 10 and which is accessible only when a buyer 20 logs into the system 10. To assist in these communications, standard form language can be provided to both the seller 30 and the lender 40 for their use. In addition to computerized communication, the system 10 can track the occurrence of and notes about in-person, telephone, or written communications between the seller 30 or lender 40 and the buyer 20.

In this way, the system 10 provides a comprehensive contact management system for the seller 30 and lender 40 to manage communication with their joint, prospective client, namely the buyer 20. The present invention differs from other contact management systems in that communications are managed between two parties (the seller 30 and the lender 40) and a single prospective client 20, and that the prompts 15 to further communication 16 are managed jointly to avoid overwhelming the buyer 20 with too many contacts 16.

In order for the communication 16 with the buyer 20 to be relevant and useful to the buyer 20, the party 30, 40 that is making the communication will need information about the buyer's current status in evaluating items. Consequently, the system 10 tracks activity information and buyer notes 17 concerning the properties that the buyer 20 reviews. By examining this information 17 and the notes 13 previously created by both the seller 30 and the lender 40, the party 30, 40 making the current communication 16 will be informed about the current status of the buyer 20 and can make relevant comments and suggestions.

Basic Method

FIG. 2 shows a portion of the method used by the present invention. The method starts at step 100 with the buyer specific information 12 being entered into the system 10. This information can be input by the buyers 20 themselves, or can be input by the seller 30 on behalf of the buyer 20. Alternatively, the lender 40 could input this information. In most circumstances, it is the seller 30 that makes the offer to the buyer 20 to join the system 10. Consequently, the lender 40 may not have had any communication with the buyer 20 before the buyer specific information 12 is entered into the system 10. In order to ensure that the lender 40 and the buyer 20 communicate with each other, the preferred embodiment of the system 10 does not allow the buyer 20 to utilize the system 10 until the lender 40 submits the buyer 20 to system 10 for activation. Typically, submission for activation will occur only after the lender 40 has participated with the buyer in setting a comfortable price range for items searched for on the system 10. To allow this activation process to work properly, the method of FIG. 2 alerts the lender 40 at step 102 each time that buyer specific information 12 about a new buyer 20 has been added to the system 10. In FIG. 1, the programming that recognizes the new buyer specific information 12 and alerts the lender 40 is labeled the alerter 18. The alert signal itself is labeled alert 19. At this point, the lender 40 reviews financial information about the buyer 20 and establishes financial parameters that can be used by the system 10 in step 104. Once this is accomplished, the lender 40 at step 106 submits the buyer 20 for activation. The system 10, or more properly the individuals or organizations that operate the system 10, will receive the activation submission from the lender 40 and then activate the buyer 20.

Once the buyer 20 is activated, the buyer 20 at step 108 can cause the system 10 to generate item information 11 about items available for purchase. The item information 11 can include a list of items for sale, including detailed information about the item. The list can include information regarding a single item, or it can include no items if no items are found based on the buyer-specific information 12. In one embodiment, this item information 11 is obtained from otherwise available listings of real estate. In this embodiment, the financial parameters established by the lender 40 in step 104 can be used to control the properties available for search on the real estate listings database. In other embodiments, the buyer 20 is free to search all properties or items in the system without any regard to the financial parameters established by the lender 40.

As the buyer 20 interacts with the system 10 to review the item information 11, the buyer 20 will perform multiple searches against an item database. In addition, the buyer 20 will likely desire to store certain items or properties in a notebook for later review. The system 10 is designed to allow such item selection and storage, and also allows the buyer 20 to keep custom notes on the selected items. Furthermore, the notebook of the present invention also informs the buyer 20 if any information about an item changes over time, such as the item's availability status (i.e., whether it has been sold), or its current asking price. This user interaction occurs at step 110, and the system 10 is designed to record such interaction for later review by the seller 30 and lender 40.

In addition, the system 10 is designed to allow sellers 30 and lenders 40 to input their own notes 13 about a buyer 20. These notes 13 can include notes actually written by the seller 30 and lender 40, as well as a communication log generated by the system 10 for each communication 16 tracked by the system. These notes 13 are recorded at step 112.

At step 114, the system 10 issues a prompt 15 to the seller 30 or the lender 40 encouraging them to contact the buyer 20. As explained above, the preferred embodiment uses the prompts 15 to encourage weekly communication with the buyer 20, and alternates each week between prompting the seller 30 and the lender 40 to make the communication to the buyer 20.

In this preferred embodiment, the prompts 15 can take multiple forms. In one example of managing contacts, a prompt will be indicated as a dot next to a buyer's name on a list of buyers 20 presented to each seller 30 and lender 40 when they access the system 10. The person that receives the prompt 15 to make the contact 16 will see one color of the dot by the buyer's name. The other person will see a dot of a different color indicating that the first party must make the contact. For example, the first color can be black, where the other color can be grey. In addition, to emphasize the importance of making a contact, the first color dot could include an animation, such as a pulsing animation, to bring attention to contacts that are to be made.

Once the prompt is received, the seller 30 or lender 40 who received the prompt 15 can review the seller and lender notes 13, and the record of buyer activity and notes 17. This occurs at step 116. At this point the seller 30 or lender 40 can analyze the buyer's use of the system 10, or non-use, can consider all previous communications and notes, and determine the appropriate content for the next communication 16. At step 118, the communication 16 is made and recorded by the system 10. As mentioned above, the contact 16 can be made through the system 10, and can even be made using form language proposed by the system 10. Alternatively, the contact 16 could be over the telephone, through a written letter, in person, or any other communication mechanism. When the contact 16 is recorded as being completed, some embodiments of the system 10 will withdraw or alter the prompt 15 to indicate that the contact 16 has been made. In one embodiment, the system 10 will indicate the completion of a contact 16 by placing a check within the dot on each person's listing.

Seller Method

FIG. 3 contains a flowchart showing the seller's 30 interaction with the computerized system 10 for the purpose of enrolling a buyer 20. The method starts with the seller 30 making contact with the buyer 20, and inviting them to use the computerized system 10 in their search for an item to purchase. This occurs at step 120. Once the buyer 20 shows interest, the seller 30 will access the computerized system 10 at step 122. In the preferred embodiment, the seller 30 accomplishes this with a web browser connected to a specific Internet web address. The system 10 maintains a separate page and user interface for each class of user, namely the buyers 20, the seller 30, and the lenders 40. In the preferred example, a home page at a web address presents an introduction page that allows the user to select their role by presenting separate login areas for each type of user. Alternatively, separate web addresses could be provided for each user type. To complete step 122, the seller 30 logs onto the system 10 as a seller using a user name and password. Once authorized, the computerized system 10 will display a main page customized for that seller 30.

From the seller's main page, the seller 30 can follow a link or links to a web page that will allow the seller to enroll a new buyer and to enter buyer specific information 12 for that buyer. This is accomplished at step 124. The buyer specific information 12 can include fields of basic information about the buyer 20 such as the buyer's name and address (including e-mail address). In addition, the buyer specific information 12 can contain information to help search for the item desired by the buyer 20, such as the type of property the buyer 20 is interested in purchasing, whether the buyer 20 is a first-time home-buyer or currently owns a home, minimum and maximum search price, minimum number of bedrooms and bathrooms, zip code or neighborhood description of the location of the property, and the like that includes search criteria. The search criteria information allows the system 10 to sort through all of the items in its database to identify items that may be of interest to the buyer 20. Additional buyer-specific information may include a target move-in date to notify the seller 30 when the buyer 20 gets closer to the action phase of purchase, and more detailed information about the desired items such as lot size, pool, or the like.

Once the data input is completed, the seller 30 may save the information 12 and complete the enrollment. At this point, a list of available properties is displayed to the seller 30. This list includes the available properties that fall within the buyer search criteria of the buyer-specific information 12. If an inadequate number of properties are available, the seller 30 can amend the buyer-specific information 12 to yield a better result. Once the buyer-specific information is finalized, the system 10 will send an alert 19 to the lender 40 at step 126. In addition, the seller 30 is free to add notes 13 regarding the buyer 20 that can be saved and later viewed by the seller 30 or the lender 40, which is shown at step 128.

Lender Method

Figure 4:
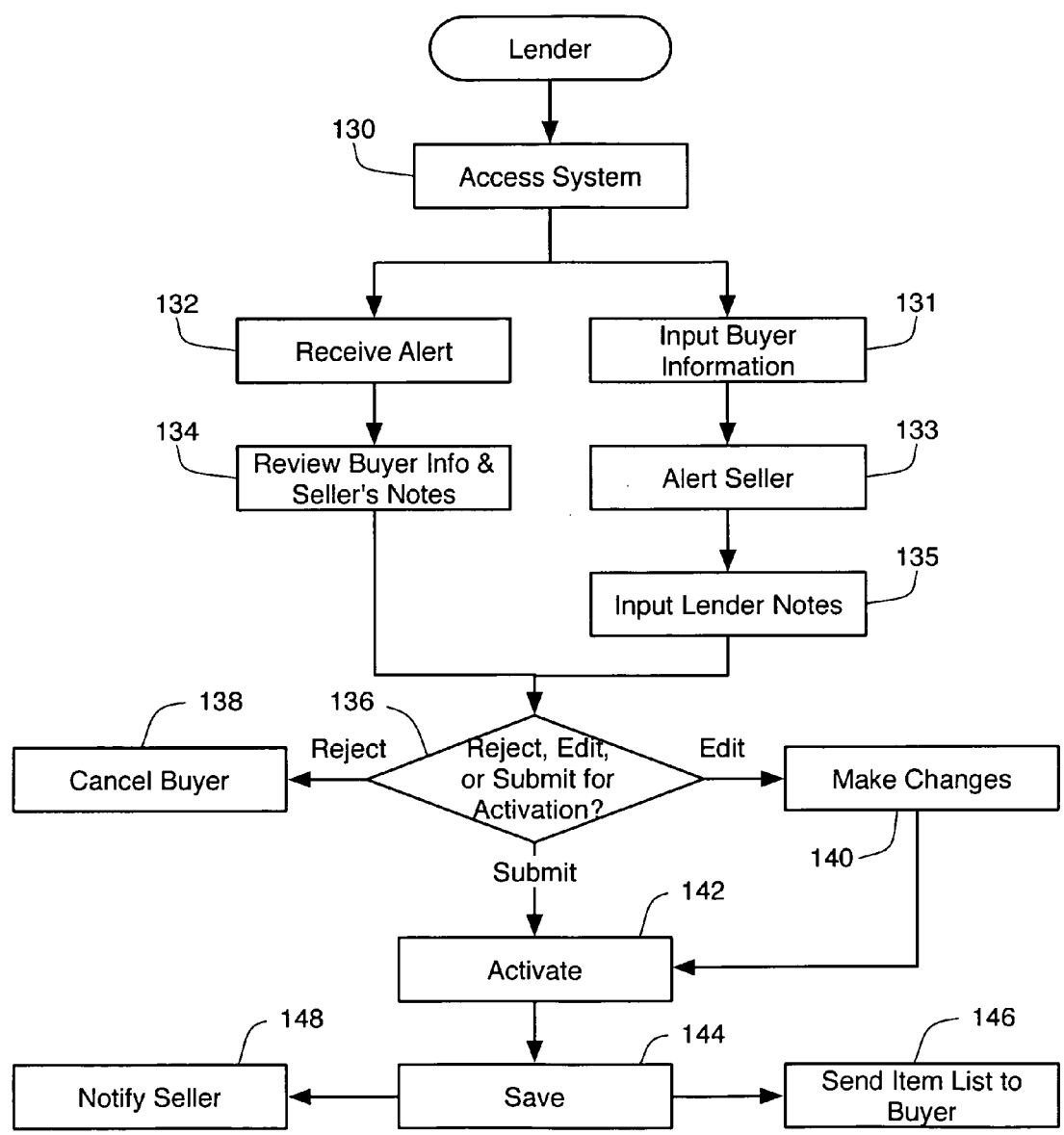
FIG. 4 is a flow chart of lender activities for submitting a buyer for activation in order to allow the buyer to use the system of FIG. 1.

FIG. 4 shows a flow chart setting forth the method used by the present invention to allow a lender 40 to submit a buyer 20 for activation. The method starts at step 130, where the lender 40 accesses a password-protected web page in a manner similar to that described in connection with FIG. 3. The lender 40 enters web site as the lender and is directed to the lender's customized main page. In the example described, the lender's main page might present the alert 19 to the lender 40 at step 132, thereby notifying the lender 40 that there is a new buyer 20 that is awaiting activation. A list of such buyers 20 will appear, together with each buyer's corresponding seller 30. In the preferred embodiment, each buyer 20 in the list of buyers awaiting activation will contain a link to a page where the lender 40 can continue submitting a selected buyer 20 for activation. The link will access a page that includes buyer-specific information 12 and the seller's notes 13 regarding the buyer 20, which is reviewed in step 134. Alternatively, the lender 40 may elect to directly enter buyer information into the system 10. This takes place at step 131. Step 133 alerts the seller 30 of the new buyer 20, and step 135 allows the lender to add notes to the system 10 about the buyer 20. These steps are similar to steps 124-128 described above in connection with the input of buyer information into the system 10 by the seller 30.

The lender 40 will next select whether to reject, amend or submit the buyer 20 for activation at step 136. This decision can be based on financial information, price range, or both. If the buyer 20 is financially unable to purchase at this time, the lender 40 can cancel the buyer 20 at step 138 thereby preventing any further access to the system 10 by the buyer 20. Alternatively, the "cancel" step 138 could simply leave the buyer 20 pending until financial issues are resolved or further information is received. The lender 40 can also amend the search criteria stored in the buyer specific information 12, such as raising or lowering the maximum price of the item based on the buyer's financial information. These changes are made in step 140, and then the lender 40 can submit the buyer 20 at step 142. Alternatively, the lender 40 can simply submit the buyer 20 for activation without amendment by choosing to go directly to submission step 142 from decision 136. During this process, the lender 40 can create notes 13 regarding the buyer 20 that the seller 30 and lender 40 can review at a later time. The lender 40 then saves the activation submission at step 144 and awaits official activation of the buyer 20 by system 10.

After the buyer 20 is activated, the buyer 20 is notified and the item information 11 containing the list of items related to the search criteria in buyer specific information 12 is made available to the buyer 20 as indicated by step 146. One example of notification is an e-mail automatically sent on behalf of the seller 30 to the buyer 20 by the system 10. This e-mail may include a welcome message as well as information on how to use the system 10. A notice also is sent to the seller 30 at step 148 that the buyer 20 is now activated. The item information 11, the amended buyer-specific information 12, and the lender's notes 13 about the buyer 20, are made available to the seller 30 at this time.

System Interfaces

Seller's Interface

FIG. 5 shows a block diagram of a specific example of the computerized system 10 as it relates to the seller's interface. The seller accesses his or her main page 160 after logging into the seller's site. The main page contains a link to an item search page 162 that allows searching of the item inventory in order to find a specific item. For example, the search page 162 could allow a user to find a particular item by an identification number or other identifying information. The main seller page 160 also contains a link to seller information 164 that allows the seller 30 to change information stored in the system 10 about the seller 30, such as a photograph and biographical information. This information is viewable by users of the system 10, including the lender 40 and buyer 20. A link to the system contacts page 166 allows the seller 30 to access help information related to the computerized system 10 and to contact the technical personnel that manage the system 10. The seller 30 also can access information regarding previous, existing or new buyers 20 from the buyer list page 168.

The buyer list 168 permits the seller 30 to list all buyers 20 that are working with the seller 30. From the buyer list page 168, the seller is able to sort enrolled buyers 20 by category and view detailed information about each buyer 20. Categories of buyers include active, pending, recently expired, or the like. The list on page 168 can be changed to show all buyers 20 according to their activity with the system 10 by switching to page 170. This page 170 lists such information as last login date, number of logins within a recent time period, number of properties viewed, and other activity information 17 stored by the system 10. From either the buyer list 168 or the buyer list by activity page 170, the seller 30 can view a detail page 172 for an individual buyer 20. From the buyer detail page 172, the seller 30 can access buyer specific information 12, item information 11 reviewed by the buyer 20, items matching the buyer's item criteria, buyer activity information and notes 17, and notes 13 about the buyer 20 made by the seller 30 or the lender 40. The detail page 172 also includes all contacts 16 with the buyer 20 that were made through or recorded in the computerized system 10. The detail page 172 also gives the seller 30 an opportunity to edit the buyer-specific information 12 stored about the buyer 20. To enroll a new buyer 20, the seller 30 goes to the enrollment page 174 and enters the buyer-specific information 12 required by the system 10.

The system gives the seller 30 the opportunity to contact one or more buyers 20, or to record out-of-system contacts with buyers 20. Generally, this is done by clicking on a link on the buyer list 168 or in the buyer detail page 172. This ability is described in more detail below in connection with FIG. 8, and is shown in the flowchart of FIG. 5 as item 176.

Lender's Interface

FIG. 6 shows a block diagram of a specific example of the computerized system as it relates to the lender's interface. The lender accesses the main lender page 180 after logging into the lender's site. The lender can access information regarding the seller 30 working with the lender 40 at page 182. The lender 40 can also create or amend lender information at page 184. This page 184 contains the information about the lender 40 that will be viewed by sellers 30 or buyers 20 accessing the computerized system 10. The link to the contacts page 186 allows the lender 40 to access technical help.

The main page 180 also provides the lender 40 with access to a buyer's listing page 188 that lists the buyers 20 in the system 10 that are working with that lender 40. From this list, the lender 40 can access a detail page 190 for an individual buyer 20. This detail page includes basic information about the buyer, the buyers notebook containing favorite items and notes, an edit screen to allow the lender 40 to edit information about the buyer 20, and a history screen containing information about past buyer 20 interactions with the system 10 as well as seller and lender notes 13 and information about past contacts 16. In one embodiment, the lender's buyer detail page 192 differs from the seller's detail page 172 in that not all of the seller's information regarding a buyer 20 is available to the lender 40. Alternatively, assuming that the buyer 20 has granted permission, all information can be shared between the seller and lender. The buyer listing 188 and detail page 192 also give the lender the ability to contact one or more buyers 20, or to record out-of-system contacts with buyers 20. This is shown in FIG. 6 as item 194, but is described in more detail below in connection with FIG. 8.

For each activated buyer 20, the lender 40 may be given the opportunity to cancel the buyer 20 through detail page 192. In addition, if the system permits only a limited enrollment period, the buyer detail page 190 may allow the lender 40 to re-enroll the buyer 20 for a new period. A buyer 20 may also request a change in their data, such as an increase in the price component of the search criteria in circumstances. This change can be implemented through detail page 192, which is an important ability when the system 10 allows the lender 40 to set this price component.

The buyers 20 that are awaiting activation are found on page 190. The activation page 190 allows the lender 40 to submit for activation, reject, or edit a pending buyer 20. Often, the lender 40 will review buyer information and search criteria 12 and the seller's notes 13 before deciding on whether to submit the buyer 20 for activation. This information is made easily available from the activation submission page 192, such as by providing a page that is similar in structure to the buyer detail page 190 with the addition of buttons for canceling or submitting the buyer 20 for activation.

Buyer's Interface

Figure 7:
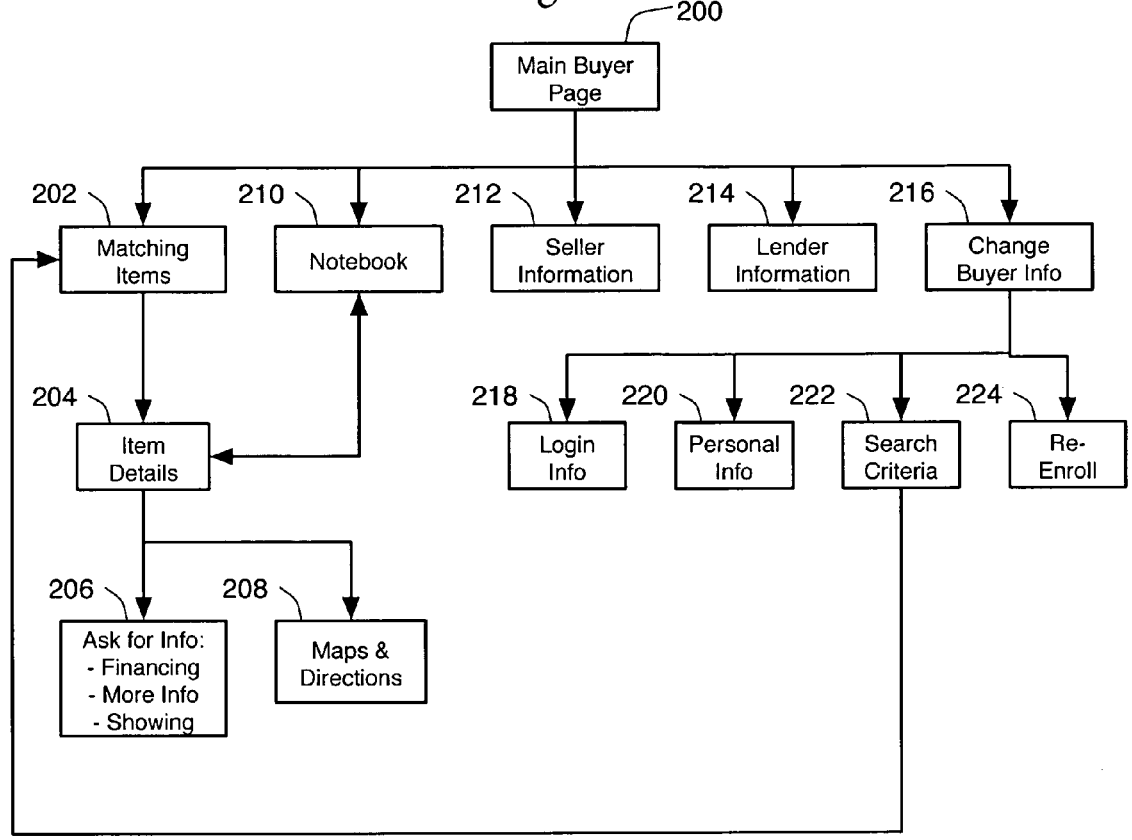
FIG. 7 is a block diagram of a buyer interface into the system of FIG. 1.

FIG. 7 shows a schematic representation of computerized system 10 as it relates to buyer's main page 200. The buyer 20 is able to access their customized main page 200 from the same web site as the seller 30 and lender 40. Access to the main buyer page 200 is secured by having the buyer 20 enter a password and user name that was provided to the buyer 20 in an e-mail from the system 10.

Some items for sale to the buyer 20 may have related legal requirements in certain jurisdictions that must be satisfied. For example, some jurisdictions have a specific Buyer-Agency Disclosure notice relating to the sale of real estate that must be acknowledged. In one example of the computerized method, a buyer 20 accessing the site for the first time will be presented with this notice before the buyer's main page 200 is presented. In the preferred embodiment, a first time user may also be presented with the privacy policy and terms of use policy for the system 10.

From the main page 200, the buyer 20 can access the item information 11 in the form of a listing of items that meet the buyer's search criteria at matching items page 202. Each item in the list of items 202 can include a link to more detailed information regarding the item at page 204. This detailed information page 204 can include a photograph of the item or maps and direction to the property or neighborhood information if the item is real estate, for example. The buyer 20 is also able to contact the seller or lender via e-mail from contact page 206. Using this contact page 206, the buyer 20 can request finance information about a property, request more information, or request a showing of the property or item. Links to the contact page 206 generally relate to an individual item. These links pass that item information to the contact page 210, thereby allowing the buyer 20 to discuss an individual item without having to manually identify the item of interest. The item detail page 204 also allows the buyer to access at page 208 a map and direction information for an item if the item is real property.

The buyer 20 is also given the opportunity to add an item described in a detail page 400 to a buyer's notebook, which is presented to the buyer 20 at page 210. The notebook page 210 is also accessible directly from the main buyer page 200. The notebook 210 contains a subset of the items available through system 10 that the buyer 20 has individually selected. The buyer 20 uses the notebook 210 to store items or properties that are of particular interest so that the properties can be reviewed in detail at a later time. The notebook 210 in the present invention is also used to prompt the system 10 to notify the buyer 20 about changes to any relevant information concerning the items in the buyer's notebook 210. Consequently, if the price for an item in the buyer's notebook 210 were to change, the system 10 could immediately notify the buyer 20. The system 10 can also track these types of changes over time, allowing the buyer 20 to see a log of all relevant changes to an item as tracked by the system 10.

The main notebook page 210 contains a listing of all items in the notebook. From this page, the buyer 20 can access an item detail page 204 about any of the items listed in the notebook page 210. It is contemplated that the buyer 20 can create several notebooks to store more than one subset of items. The buyer 20 can delete a listing from the notebook 210 at any time. In addition, the buyer 20 is able to add personal notes to any item in the notebook 210. In fact, the preferred embodiment allows the buyer 20 to add notes to any item in the system 10, whether or not the item is currently within a notebook 210. The seller 30 and lender 40 are able to review the notebook 210, as well as any buyer notes.

The main buyer page 200 also allows the buyer 20 to access a seller information page 212 containing information about their particular seller 30, and a lender information page 214 that contains information about the buyer's lender 40. Additionally, the buyer 20 is allowed to amend certain information stored in the system 10 about the buyer through page 216. For instance, the buyer can change his or her login information at page 218 or their personal information at 220. This allows the buyer 20 to create a more secure access to the system 10 and to correct any errors made when entering personal information about the buyer 20 into the system 10. The buyer 20 is also allowed to amend the search criteria stored in the buyer specific information 12 at page 222, and then view an amended list of items at page 202. The buyer 20 may not be able to unilaterally amend all fields of the search criteria. For example, the buyer might be prevented from amending a field related to maximum price after activation without consulting with the lender 40. Other fields, such as number of bathrooms or neighborhood may be freely amended. Finally, if the enrollment of the buyer 20 has expired, the buyer 20 may not be able to access his or her matching items 202 or notebook 210 until the buyer is re-enrolled. Page 224 allows the buyer 20 to request re-enrollment.

Contact Method

Figure 8:
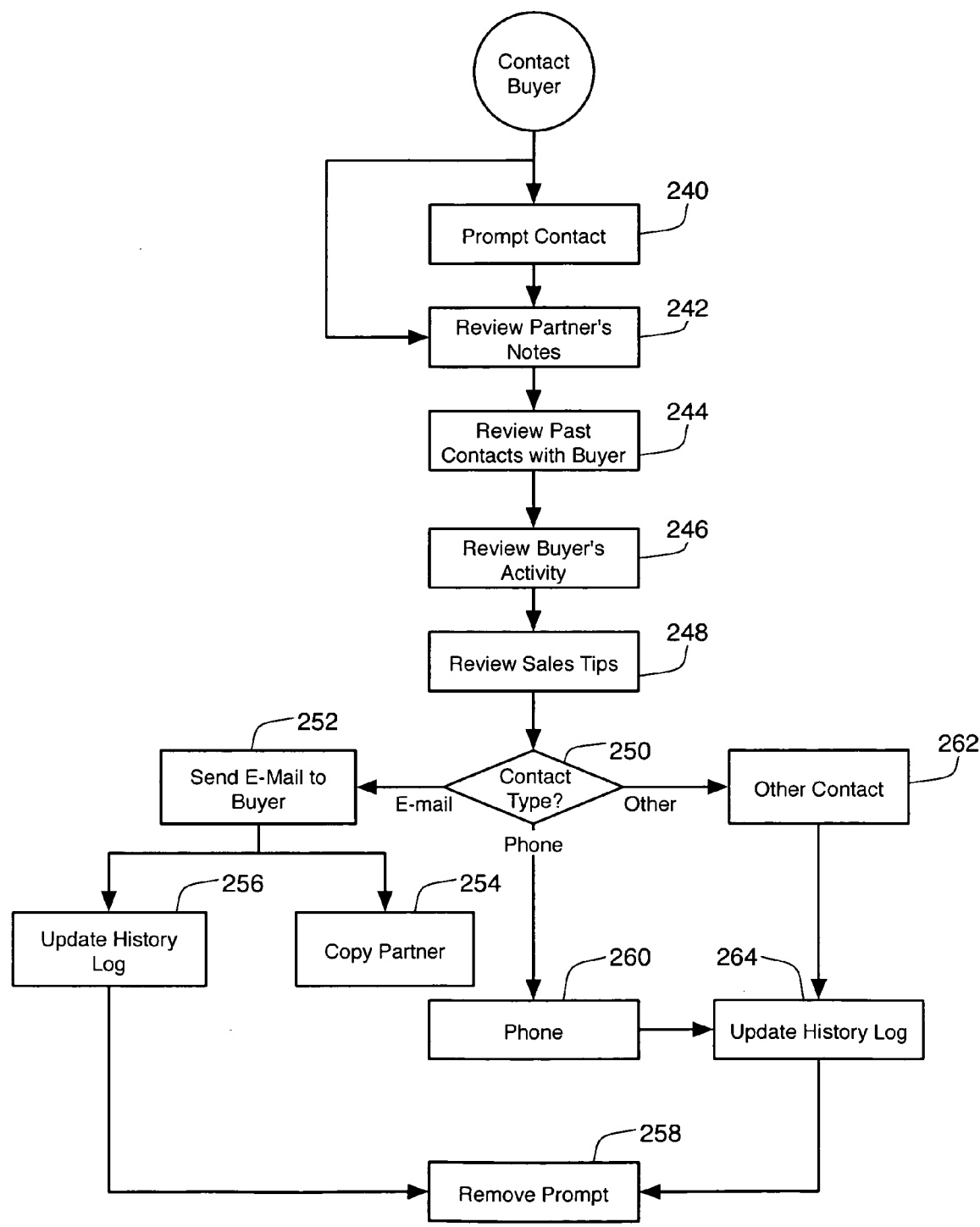
FIG. 8 is a flow chart of seller or lender activities in contacting a buyer in the system of FIG. 1.

FIG. 8 shows a flow chart of a method to manage contacts from the seller 30 or lender 40 to the buyer 20. This method can be reached through the seller's main page 160 at item 176, and through the lender's main page 180 at item 194. At this point, the seller 30 and lender 40 cooperate in their contacts with the buyer 20, although they do not enter into any type of legal partnership. The method begins when one of the parties receives a prompt 15 to make a contact 16 with the buyer 20 at step 240. This prompt might be a symbol, such as a pulsating black dot next to a buyer 20 on a list of buyers. Other methods of prompting include providing a list containing only those buyers 20 that the system 10 is currently prompting that person to contact. It is also possible that a communication with a buyer 20 will take place without anyone receiving a prompt 15. In this case, step 240 is skipped.

Before making contact with a buyer 20, the prompted individual may wish to review the information contained about the buyer in system 10. The flowchart in FIG. 8 shows the prompted individual reviewing the notes 13 of the other parties at step 242 as well as the notes 13 that they and the system have made regarding previous contacts 16 with the buyer at step 244. The prompted individual can also review the buyer's prior activity with the system at step 246. This activity will include whether the buyer 20 has accessed a listing, created a notebook, added notes, or the like. In one example, the system 10 will also provide a list of sales tips 248 to aid the prompted individual in making an effective contact with the buyer 20. The person responsible for the contact can then choose how to make the contact at step 250—whether by phone, by e-mail, or another way. If the contact is made by e-mail 252, the sender of the e-mail can choose to send a copy of the e-mail to the other parties responsible for communicating with the buyer 20 at step 254. In addition, form e-mails can be provided to aid in the creation of the e-mail. When the e-mail is sent, the system 10 automatically updates the history log at step 256 and then saves the e-mail for future reference. Once updated, the system 10 removes the prompt 258. The removal of the prompt 15 can take many forms depending on the form of the prompt 15 itself. In the preferred embodiment, the prompt 15 is a symbol that appears next to a buyer 20 in a buyer listing. This symbol is changed once the contact has been made, such as by placing a check mark over the symbol and by causing any animation (such as pulsing) to cease.

If the contact 16 is made with the buyer 20 by phone 260 or by other means 262, the system presents an entry screen in which the contact particulars (date, time, location, etc.) and notes about the contact 16 can be stored. At step 264, the history log of contacts with the buyer 20 is then updated. Any prompt 15 for that buyer 20 will be removed at step 258.

Application of the System as a Business Development Tool

Research has demonstrated that an agent or seller 30 who already sells at least one to two million dollars in real estate per year has already reached the point of diminishing returns for client development efforts. In a typical process of selling a home, the real estate agent might get 25 to 30 contacts per month (some real estate agents may get 25 to 30 contacts per week) that are interested at some level in purchasing the home. As used here, a "contact" is a prospective buyer 20 who contacts the seller 30 inquiring about information on a specific house. Some of these contacts may be merely curious about the homes that are currently for sale, but may be disinterested in buying the specific home or any home at this time. Others, perhaps as few as two contacts per month, will be serious buyers. Most agents 30 will ignore the less serious contacts, meaning that those contacts are lost. Of the two serious buyers 20 pursued by the agent, only one might become a client of the agent 30. The agent's client development efforts have reached the lost contacts, but the real estate agent must use different efforts to convert the lost contacts into clients.

Research has been directed at the buying patterns of the lost contacts. For example, approximately fifty percent of an agent's contacts will purchase a home within the next twelve months. In addition, the buying process of 5,000 homebuyers was tracked and it was discovered that the average homebuyer takes approximately six to nine months from their first contact with a real estate agent before they are ready to buy a home. Approximately 90 percent of the time between first contact and purchase was spent during a period labeled the education phase. The prospective buyer seeks information, shops for and compares homes, and builds confidence in the home buying process and home prices, and the like, during the education phase. During this phase, the average prospective buyer contacts seventeen agents. Accordingly, at least sixteen agents have lost the opportunity to sell a home to the buyer.

Real estate agents expend a great deal of time and efforts on developing prospective buyers and sellers. A greater number of home sales results in a larger number of commissions for the agent. Real estate agents use buyer seminars, advertising, personal relationships, open houses, telemarketing, past clients, the Internet, and the like, to develop prospective clients. These client development efforts cost money and take time away from the process of buying or selling a home, which directly leads to commissions. Conventional wisdom, however, believes that increasing client development efforts will increase the number of prospective buyers and sellers that, in turn, will translate to higher commissions for the real estate agent. This is true to a point, but a real estate agent needs a more efficient way of converting client development efforts into commissions.

The research also included a survey of 1,058 real estate agents. Based on that survey, the average agent spends only two to four weeks with a buyer prior to purchase of a home. This occurs typically after the education phase and is called the action phase. Only ten percent of an agent's contacts happen during the action phase, and ninety percent of an agent's contacts occur during the education phase. Accordingly, by not focusing on buyers in the education phase, agents lose about ninety percent of the contacts created by their client development efforts.

Lenders, such as a loan officer, usually become involved in the process after the contact is ready to buy. At this point, the real estate agent can choose to work with one of several lenders with which the agent has a personal relationship. A lender is more or less in limbo while the agent and buyer view homes and work together to make a purchase. A lender should enter the home buying process at an earlier point, and preferably during the education phase.

Finally, buyers would be better served if they received the attention of sellers and lenders earlier in the home buying process. Buyers, through individual attention from the agent and the lenders, could speed up the education phase, and therefore be ready to buy if a desirable home becomes available early in the process. Through individual attention, the buyer's specific questions could be answered and needs met to help create a more sophisticated and confident buyer, which is certainly a benefit in the home buying process.

The assignee of the present invention has recognized these issues in their use and development of the computerized system 10. In the preferred embodiment, the lender 40 manages the system 10, or more preferably, a financial company that employs a plurality of lenders 40 manages the system 10.

Assuming the services provided by the system 10 are more convenient, useful, or powerful than similar services provided free over the Internet, buyers 20 will view access to the system 10 as an advantageous perk. In this way, buyers 20 will voluntarily give contact information to sellers 30 and agree to receive contact communications 16 in exchange for access to the system 10. This allows sellers 30 to keep contact with all of their potential customers, especially those buyers 20 that are in the education phase and might otherwise be lost to the seller 30.

The system 10 is designed so that every buyer 20 is associated with a seller 30 and a lender 40. The contacts 16 received by the buyer 20 from both the seller 30 and the lender 40 keep these individuals fresh in the mind of the buyer 20. In addition, the main buyer home page ideally is configured to prominently display information about both the seller 30 and the lender 40 every time the buyer 20 accesses the system. In the preferred embodiment, a splash screen containing information about the seller 30 and lender 40 is shown to the buyer before the buyer 20 can access their main page 200.

Institutional Hierarchy

Figure 9:
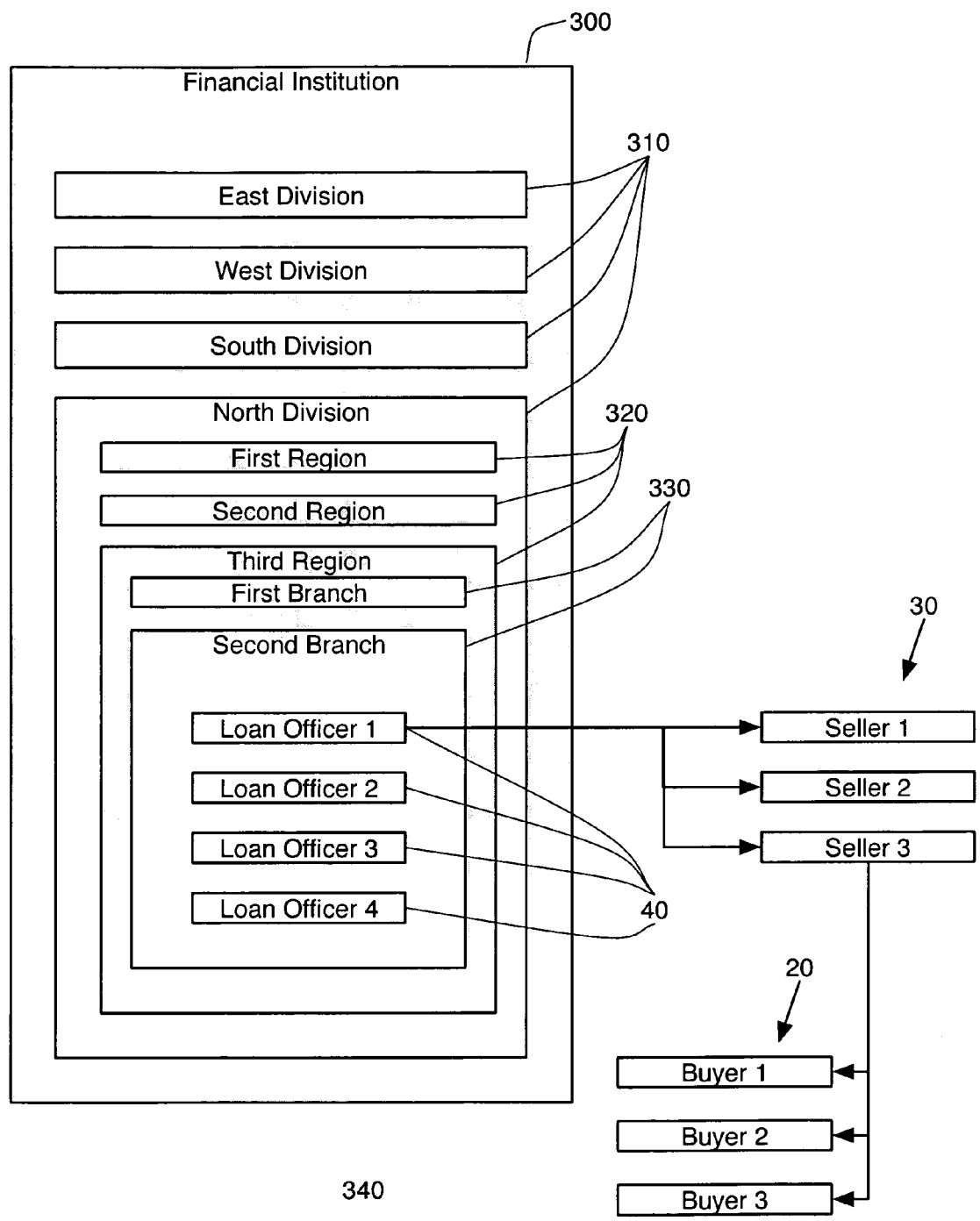
FIG. 9 is a schematic representation of financial institution hierarchy.

The primary benefactors of the computerized system 10 are financial institutions who have numerous lenders 40 within their organization. One such institution 300 is shown in FIG. 9. This lender institution 300 is divided into a business hierarchy, which in this case divides the entire institution into four divisions 310. These four divisions 310, named East, West, South, and North, are each divided into separate regions 320. In FIG. 9, only the North division 310 is shown with multiple regions 320, even though all divisions 310 are likely to have separate regions 320 in an actual lender institution 300. Each region 320 is likely to contain a plurality of branches or offices 330, such as the First and Second Branches 330 shown as part of the Third Region 320 in FIG. 9. Each branch 330 in turn is likely to hire a plurality of loan officers, who are the actual lenders 40 that make contact with the sellers 30 and buyers 20 in the above examples.

In FIG. 9, Loan Officer 1 works for the Second Branch 330 of the Third Region 320 of the North Division 310 of the Lender Institution 300. This Loan Officer 40 works with three real estate agents, who are the sellers 30 of the above examples. The third seller 30 (labeled "Seller 3" in FIG. 9) has signed up three buyers 20 to be associated with that seller 30 in the computerized system 10. Each of these three buyers 20 is also associated with Loan Officer 1. The financial institution 300 will encourage all of their lenders or loan officers 40 to actively use the system 10 to work with sellers 30. If each lender 40 works with numerous sellers 30, and each of the sellers 30 encourages multiple buyers 20 to use the system 10, the financial institution 300 will soon have many prospective buyers 20 using the system 10 and being consistently reminded of the financial services provided by the institution 300.

The hierarchy shown in FIG. 9 is merely an example hierarchy for the purpose of explaining the present invention. Other hierarchies are commonly used in financial institutions, and are well within the scope of the present invention.

Business Model and Planning Tool

Figure 10:
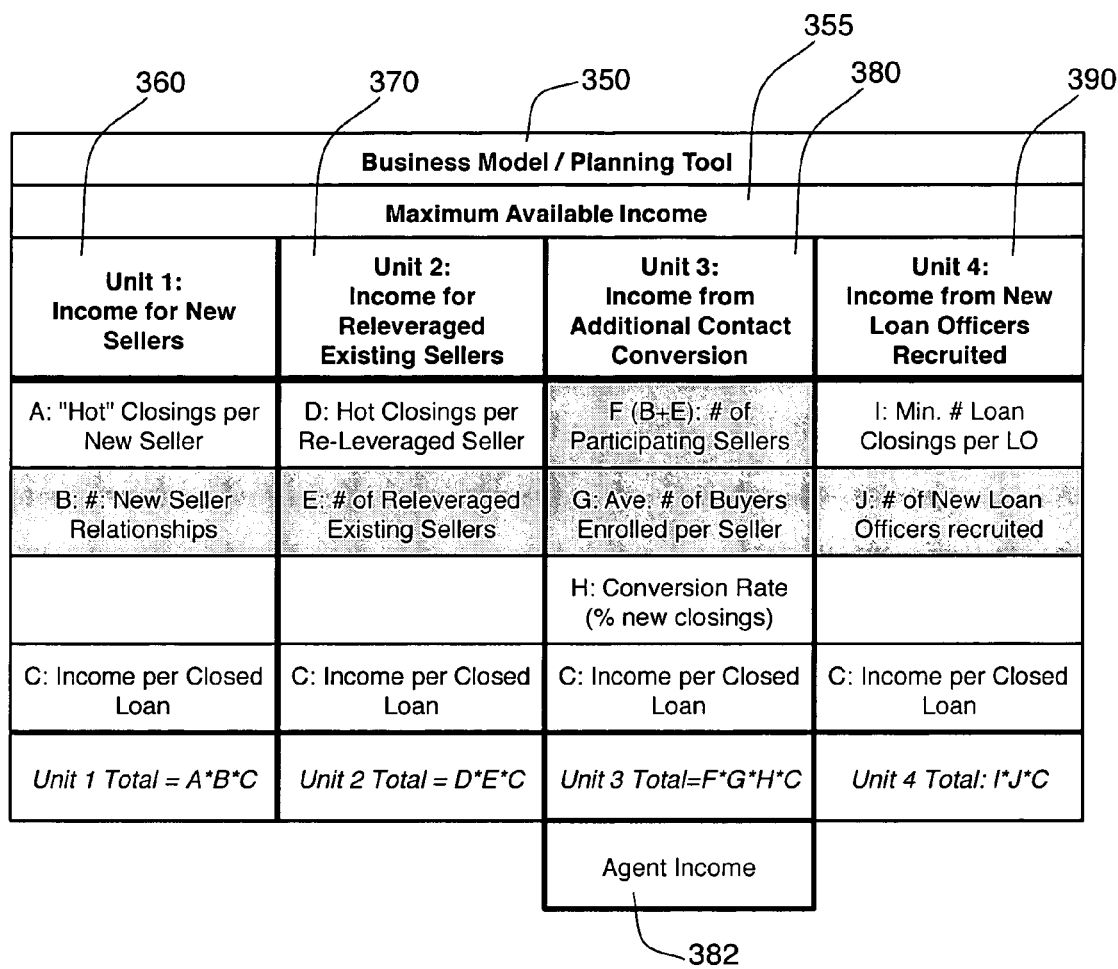
FIG. 10 is a table showing the primary features of a prior art business model for financial institutions.

In the preferred embodiment, a single application service provider provides the computerized system 10 to multiple lending institutions 300 and maintains the system 10 and the related data for each of the institutions 300. The application service provider recruits lender institutions 300 by presenting a compelling economic advantage for the institution 300 to implement the system 10 for its lenders 40. This can be accomplished by presenting a business model and planning tool that explains the potential revenue increase that might be experienced by a financial institution 300 that uses the system 10. One such business model 350 is shown in FIG. 10. This business model 350 contains four units 360, 370, 380, and 390, each of which describe a separate source of increased revenue available as a result of using the computerized system 10. Before these units are evaluated, a maximum available income tool 355 is evaluated to determine the maximum income available to the business unit without increasing overhead expenses. This tool 355 is described in more detail below in connection with worksheet 640.

The first unit 360 of the planning tool 350 is designed to estimate the income that will be returned to the financial institution 300 as a result of working with new sellers 30. Each new seller 30 that works with a loan officer 40 in the institution 300 will be associated with a certain number of new closings per month, even without the benefits of the computerized system 10. This number of "hot closings" is estimated by a representative of the lender institution 300, and is represented by the letter "A" on the table of FIG. 10. This number is multiplied by the number of new sellers 30 that may work with the lender as a result of the computerized system 10, which is represented by the letter "B". These two values are multiplied together, and then multiplied by the income that the institution 300 estimates that it generates per closing (or "C") in order to determine the total income for the first unit 360 of the business plan 350.

The second unit 370 relies upon "re-leveraging" sellers 30 that already do business with the financial institution 300. The loan officers 40 at the financial institution re-leverage an existing seller by encouraging these sellers 30 to use the system 10. The value obtained by re-leveraging sellers 30 is calculated by having the lender institution 300 estimate a number of additional "hot closings" per re-leveraged seller 30 ("D") that would otherwise have been lost, and multiplying this by the number of sellers that will be re-leveraged ("E") and the income to the institution 300 per closing ("C"). For the purposes of this model, a seller 30 is considered "re-leveraged" when they become users of the system 10.

The third unit 380 reflects the fact that each lender 40 using the system should be able to create more closings ("incubated closings") by encouraging buyers 20 to use the system 10. Without the system 10, the sellers 30 would have excluded those prospective buyers 20 that are in the education phase of their home buying process and are not good potential customers in the short term. With the system 10, these buyers 20 can be managed and communicated with, which should potentially bring about more closings for the lender 40. To calculate this value for the institution 300, the number of participating sellers ("F") is multiplied by the number of buyers each seller 30 will input ("G"), which in turn is multiplied by the conversion rate estimated by the lender institution 300 ("H") and by the income received by the institution 300 per closing ("C"). This unit 380 is also able to calculate (at box 382) an amount for additional revenues that could be received by the sellers 30 that utilize this system 10 as a result of additional contact conversions.

Finally, the fourth unit 390 reflects the fact that the use of the system 10 by the financial institution should increase the productivity of the loan officers 40, and therefore should aid in the recruitment of more loan officers 40. The potential value of this recruiting tool is calculated by taking the minimum number of loans that are required by the institution 300 from each loan officer 40 ("I"), and multiplying this by the number of loan officers that have been recruited based in part on the availability of the system 10 ("J") and the income per closed loan as estimated by the lender ("C"). The number of new loan officers J is limited by a maximum number of loan officers desired by each branch 330 of the financial institution 300 using the system 10.

The total potential income increase to the institution 300 is calculated by adding the four units 360-390 together. This could be calculated on a monthly basis (with each of the calculation values reflecting a monthly value), an annual basis, or on any other basis that makes sense to the institution 300.

A manager of the local branch 330 is generally assigned the responsibility for inputting the appropriate values into the various units 360-390 of the planning model 350. Specifically, assuming "per month" values, the manager will be asked to provide a goal value for each of the following four items:

1) the number of new sellers 30 per month who will be encouraged to use the system 10 ("B" from unit 1-360, with "new sellers" being defined as those sellers 30 who had not previously done business with the institution 300), 2) the number of existing sellers per month who will be encouraged to use the system 10 ("E" from unit 2-370, with existing sellers being those sellers 30 who had previously done business with the institution 300), 3) the predicted number of new buyers 20 each new seller 30 or lender 40 will input to the system 10 per month ("G" from unit 3-380); and 4) the number of new loan officers to be recruited by the financial institution each month ("J" from unit 4-390).

These four goal items are shaded on FIG. 10, along with item "F" which is the sum of items "B" and "E". The remaining values in the planning tool, namely items "A", "C", "D", "H", and "I", are not goal values that the branch manager is trying to achieve, but rather are values that are used to convert the goal values into a dollar total at the last row of each unit 360, 370, 380, and 390 shown in FIG. 10. The income per closed loan for the institution 300 ("C") can be determined by the financial institution examining its own records, while the minimum number of loans per month required per loan officer 40 ("I") is determined by financial institution's company policy. The number of "hot" closings per month for a new and re-leveraged seller ("A" and "D") can be adjusted over time based on the experience of the institution. The conversion rate ("H") can also be adjusted over time based upon the experience of the institution 300.

Management Site

The four-unit business model 350 existed in the prior art in association with the non-computerized process described above in the second paragraph of the Background of the Invention section of this disclosure. Reports were sent to branch managers that included the numbers of buyers 20, sellers 30, and loan officers 40 that were participating in the process. However, the business model 350 has never before been implemented in a computerized system 10 that is directly usable by a financial institution's managers as described herein.

In particular, this is the first system that allows a manager to track the goals found in the four units 360-390 directly against real-world values relating to the use of the system 10. Feedback on meeting plan goals can be provided every time a manager logs into the system 10. In addition, only in the present computerized system 10 can individual business plans for branches 330 be aggregated together to form a plan for regions 320, divisions 310, or even the entire institution 300. Information from all branches 330 in a region 320 is "rolled-up" for the benefit of the manager of that region 320. This information is made available not only to the manager of each region 320, but also to the manager of each division 310, as well as to those individuals that are responsible for the performance of the entire institution 300. By rolling this data up to the different levels of the institutional hierarchy, a powerful management tool is created that allows managers to see live performance data for the hierarchy levels and individuals that they manage.

Figure 11:
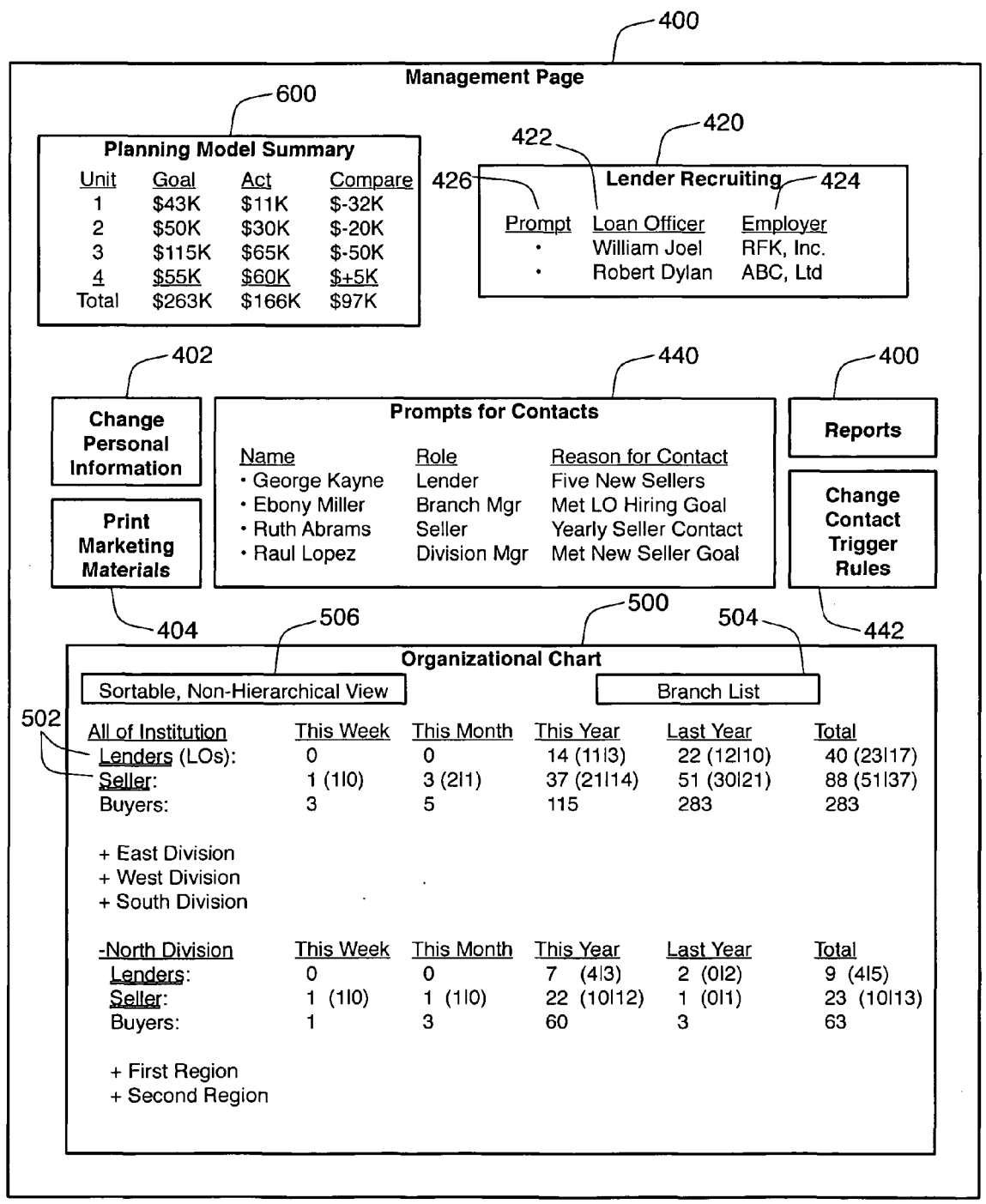
FIG. 11 is a block diagram of a management interface into the system of FIG. 1.

The present invention presents this information and additional resources to these managers through a management portal to the system 10 such as management page 400 shown in FIG. 11. This page 400 represents the type of information that may be useful to a manager of a branch 330, region 320, division 310, or any other hierarchy level in a financial institution 300. In particular, the management page 400 includes the ability of a manager to access and change personal information about herself or himself by following link 402. In addition, the page contains a link 404 for the manager to access marketing materials, training materials to train people on the system 10, and the planning tool 350.

In addition to these basic links, there are four primary tools presented through the management page 400, namely loan officer recruiting tool 420, contact prompting tool 440 for contacts to be made by the manager, an organizational chart tool 500 containing information about hierarchy levels and the individuals being managed by the manager, and planning model information tool 600. Each of these tools 420, 440, 500, and 600 can be shown on the main management page 400 with some summary information as shown in FIG. 11. Alternatively, the management page 400 can simply provide links to separate pages that provide the manager with additional information and options dealing with each tool 420, 440, 500, and 600. As a third embodiment, the management page 400 could focus in on only one important tool, such as the organizational chart tool 500, and merely include links to all of the other tools 420, 440, and 600. In addition, although these tools 420, 440, 500, and 600 are described separately in this description of the present invention, it would be well within the scope of this invention to combine some or all of the information and options available within the separate tools into a single common interface. For example, the organizational chart 500 is designed to provide certain types of information about hierarchy levels within the financial institution 300. This chart 500 could optionally include information down to the individual level, with prompts for individual contacts that are shown within tool 440 in FIG. 11. Furthermore, while planning model information 600 is shown as a separate tool, it too could be combined with the information found in the organization chart 500. Finally, while prompts and prospective loan officer information are shown in the loan officer recruiting tool 420, it would be possible to combine this information and prompts within the prompts for contacts tool 440. Consequently, while these tools 420, 440, 500, and 600 are considered separate features of the management page 400 in this description, the combining of several tools together or the removal of other tools from the management page 400 should still be considered within the scope of the present invention.

Lender Recruiting Tool

The lender recruiting tool 420 is designed to allow managers at any level of the financial institution 300 to directly monitor and participate in the recruitment of loan officer candidates into the financial institution 300. Such recruiting is an integral part of the fourth unit 390 of planning tool 350, and is a key component to increasing the productivity of the financial institution 300. The recruiting tool 420 in its simplest form is a database of candidates that are not currently employed by the financial institution 300 but have been selected as recruiting targets by the manager. The database contains the candidate's name 422, current employer 424, contact information, priority (such as hot, warm, cold), notes, and prior contact information. Furthermore, the system is able to roll-up recruiting tool 420 information to managers higher up in the hierarchy of the financial institution 300. This allows a regional manager to spot potential issues, such as when two branch managers are recruiting the same candidate. This ability also allows a manager to spot trends in the institution's lender recruiting practices, including a heavy emphasis on candidates currently employed by a single competitor. In addition, the recruiting tool 420 includes prompts 426 that indicate when the manager should contact the prospective candidate. Ideally, the system 10 will track the last time that the candidate was contacted, and will prompt the manager to make regular contact with the candidate. In the preferred embodiment, the responsibility to contact a candidate can alternate between two or more managers. For instance, the system 10 could prompt for weekly contacts from a manager, with three out of four contacts coming from the branch manager, and one out of four contacts coming from the regional manager. This division of contact responsibility would automatically be handled by the system 10, prompting each manager when it is their turn to contact the candidate much like is described above in connection with lender 40 and seller 30 contacts with a buyer 20. Upon selecting the prompt 426, the system preferably opens a notes page in which the manager can track notes about the candidate or send an e-mail to the candidate. In the preferred embodiment, the branch manager is encouraged to maintain a list of ten potential candidates in the lender recruiting tool 420.

Contact Prompting Tool

The contact prompting tool 440 is a tool designed to centralize all of the contact responsibilities of the manager into a single place. In the preferred embodiment of the system 10, a manager may be expected to make regular contacts with prospective candidates, as described above in connection with the lender recruiting tool 420. In addition, a branch manager may be responsible for contacting existing loan officers 40 every week to discuss their progress with the system 10, and for contacting enrolled sellers 30 twice a month to thank them for their business and to encourage their use of the system 10. Similarly, a regional manager may be expected to send e-mails to all sellers 30 working in their region every other month. Such regular contacts can be easily programmed according to the desire and preferences of the financial institution 300. As explained previously, the system 10 manages such contacts by tracking when the next contact is due, and then prompting the responsible party to make the contact at the appropriate time. The sharing of the responsibility to contact a person between two different users of the system 10 is also easily programmed into the contact prompting tool 440. Because of the hierarchical nature of the present invention, managers at any level of the institution 300 can be prompted to contact lower level managers as well as those lenders 40, sellers 30, and buyers 20 that are associated with their section of the hierarchy.

In addition to regularly timed contacts, the system 10 is designed to monitor the activities of individual users and to track statistics associated with specific entities within the hierarchy of the financial institution 300. The system 10 can then be programmed to automatically trigger certain communications from managers based upon the monitored activities and statistics. For instance, system 10 can be programmed have a manager contact an individual in the following circumstances:

| Who to Contact | Circumstances |
| --- | --- |
| Branch Manager | Hiring of new loan officer 40 |
| Branch Manager | Meeting goal in any unit 360–390 of financial plan 350 |
| Loan Officer 20 | Linking with new seller 30 |
| Loan Officer 20 | Linking with ten new sellers 30 |
| Seller 30 | Bringing $10,000,000 of loans into the institution 300 |
| Regional Manager | Hit 60% of goal in hiring new loan officers 40 |
| Division Manager | All branches have completed financial plan 350 |

These prompts allow the manager to recognize those individuals in their area of responsibility that have met certain milestones. In addition, these prompts provide a quick indicator of corporate success in implementing the system 10 and the financial plan 350. While it is generally preferable to have such triggers be based on positive results, it is also possible to have triggers indicate a contact is needed when goals are not being met. For instance, if a branch has not yet completed its financial plan 350, the regional manager could be prompted to remind the branch manager to do so. Alternatively, the system could track those lenders 40, sellers 30, and managers who do not make their prompted contacts when the system 10 requests, or who regularly fail to complete a certain percentage of prompted contacts. In these circumstances, an e-mail from a superior may be useful to remind them of the importance of completing the prompted contacts.

The managers of the system 10 can easily program these prompts by following link 442. The prompting rules can be established so that they are uniform throughout a financial institution 300. When more than one institution is being serviced by an application service provider, it is even possible that the prompting rules can be made uniform across multiple financial institutions 300. Alternatively, the system 10 can be designed so that each manager can customize their prompts to more closely match their management style. In one embodiment, an institution 300 creates a uniform set of prompting rules, and each manager is given limited flexibility to change a subset of those rules.

It is possible to use these same trigger rules to present messages to the manager that do not require a contact to be made with another individual. In this way, the system could be programmed to automatically remind an individual to perform a task, or to have the system notify the branch manager automatically when a goal in one of the units 360-390 of their business plan has been met. While these notices could be programmed in much the same way as the prompts for contacts 440, the notices would not have to appear within this tool 440, but could appear elsewhere on the management page 400.

In addition, trigger rules can be used to prompt contacts with buyers 20. For instance, if a buyer 20 had been enrolled but had not made any use of the system 10 for a certain period, a prompt could be made to the seller 30 or lender 40 to contact the buyer 20 to answer any questions the buyer 20 may have. In this way, prompts to contact buyers 20 can be based both upon timing considerations and upon the occurrence of particular events.

Organization Chart

The organizational chart tool 500 is designed to provide the manager an overview of their portion of the institutional hierarchy. The organizational chart 500 shown in FIG. 11 includes data about the entire institution 300, including all four divisions 310 and all regions 320 and branches 330. A manager of a particular division 310 would likely be allowed to see only data related to their division 310. The organization chart 500 is presented in the manner of a collapsible outline, starting with the highest level of the institutional hierarchy visible to the manager. In this case, the entire institution 300 is at the top of the tool 500. Underneath this are listed the four divisions 310: East, West, South, and North. In the preferred embodiment, it is possible to expand and contract each level of the hierarchy so as to show only the data of interest to the manager. Collapsed items may include a plus ("+") character next to them. Clicking on this character will expand that item. Expanded items may have a minus ("−") character, which is used to collapse that item. In FIG. 11, the East, West, and South Divisions 310 are collapsed, while the North division 310 is expanded. The North Division 310 includes two regions 320 (First and Second), both of which are collapsed. A non-hierarchical view of the organization chart 500 is available by following link 506. This view lists all levels of the hierarchy, and allows the levels to be sorted according to the data columns found in the organization chart 500.

Each expanded level of the organization chart tool 500 includes information about how that level is meeting the goals of the business plan 300. In particular, the tool 500 shows a count of new lenders or loan officers 40, sellers 30, and buyers 20 that are added to the system 10 in several time frames. The time frames are preferable the current week, month, and year, and the last week, month, and year, and the total for the system to date. In the preferred embodiment, the entries for lenders 40 and sellers 30 are further divided into three parts according to the following structure:

Total (New|Existing)

The reason that the numbers are divided in this way is that it lets the manager distinguish between people who are new to the financial institution 300 and those existing lenders or loan officers 40 and sellers 30 who have started to use the system 10. The distinction between new and existing sellers is important in determining whether the goals of the business model 350 are being met. This is because element "B" relates to new seller relationships and element "E" relates to sellers that already work with a lender 40 or the institution 300 but have just begun to use the system 10. In addition, item "J" relates only to new loan officers 40 that are now using system 10 and not to pre-existing loan officer employees who have started to use the system 10.

Figure 12:
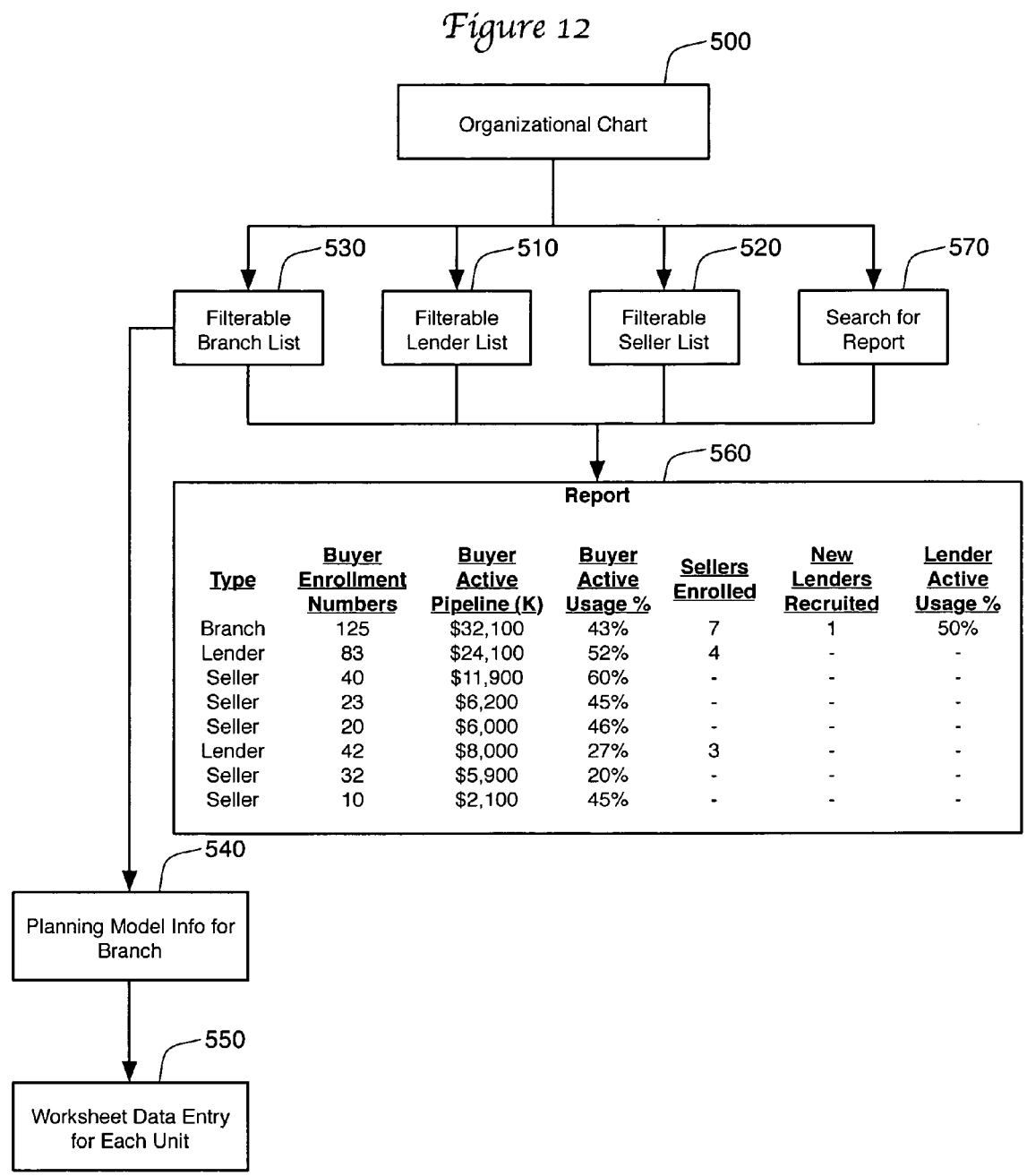
FIG. 12 is a block diagram of the organization tool interface found in the management interface of FIG. 11.

As seen in FIG. 12, the organizational chart tool 500 is a useful tool to reach other information about the performance of a financial institution 300. By clicking on the "Lenders" or "Sellers" labels 502 in the organizational chart 500 (FIG. 11), the management page 400 will switch to a filterable lender list 510 or seller list 520, respectively. The lender list 510 is shown in more detail at FIG. 13. As seen in that figure, the list contains for each lender 40: their name, branch, contact information, enrollment date, total count of buyers 20 in the system associated with that lender 40, the pipeline amount equal to the loan value estimated for all of the active buyers 20, the count of sellers 30 associated with that lender 40, and a plurality of links in the form of icons. The buyer count and pipeline statistics refers to active buyers, which in this context includes pending buyers that have been placed into the system but have not yet been activated by the system 10. The seller count includes a total value, as well as sub-values for new and existing sellers. The links include links to additional pages about this lender 40. In the preferred embodiment, the links include a link to history log page that shows login times and activities for this lender 40. Additional links include a link to a seller list 520 listing the sellers 30 associated with this lender 40, a link to the main home page 180 for this lender, and a link to a report 560 for this lender 40. The Seller list 520 is very similar, but includes information about a particular seller 30 and the seller count field is replaced with a listing of the loan officer 40 associated with each seller 30.

There is also a branch list 530 that lists all the branches 330 in the financial institution 300 and their managers. The branch list 530 is available by following link 504 on the main section of the organization chart tool 500. The branch lists contains fields similar to the lender list 510, with the addition of a field indicating the number of new lenders 40 that have been recruited at that branch 330. The branch list also includes a link to a page 540 showing the business model 350 data for that branch 330, and a link to a data entry page 550 for each unit 360-390 that allows a manager to complete all elements of the business model 350 for that branch 330.

Each of the lists 510-530 includes the ability to filter the lists according to filter criteria that relates to displayed data columns and is entered at fields 512 and 522. In addition, the preferred embodiment includes the ability to send broadcast e-mails to selected members of any list. This is accomplished by providing a checkbox next to each entry on the list. The manager checks the desired recipients (or the "check all" button 514, 524), and then sends a broadcast e-mail to all checked parties by clicking on button 516 or 526. The content of the e-mail can be chosen from a stored message database, or can be custom created.

The report page 560 can be accessed simply by clicking on one of the links next to a lender 40, seller 30, or branch 330 on the lender list 510, seller list 520, or branch list 530 pages. Alternatively, a search page 570 could be used to customize a report. In the preferred embodiment, particular reports can also be saved on the search page 570, such as whole-institution reports or division-level reports. The actual report page 560 contains additional details about lenders 40, sellers 30, and organization entities within the financial institution 300. FIG. 12 shows the type of information available on the report 560, including buyer enrollment numbers, pipeline figures, active buyer percentages, associated sellers 30, lenders 40 recruited, and active lender percentages. Some of this information is not appropriate for sellers 30 (such as associated sellers) while other information is appropriate only for entities and is not appropriate for sellers 30 or lenders 40 (such as new lenders recruited or active lender percentages). Where such data is not appropriate, the field is left blank as shown in FIG. 12.

The report 560 preferably contains more detailed columns for data than that shown in FIG. 12. For instance, the preferred embodiment report 530 contains nine different buyer enrollment columns (to date total, to date active, enrolled pending activation, this week, last week, this month, last month, this year, and last year). In addition, the active usage percentage column is preferably divided into percentages of buyers who have: i) logged in ever, logged in within the last seven days, iii) have items in their notebooks, and iv) have saved items in their notebooks in last three days. Similarly, the associated sellers and lenders recruited column can be divided into the same types of categories as the buyer enrollment column, and can even be further divided into new sellers 30 versus existing sellers 30 and newly recruited lenders 40 versus existing lenders 40. Finally, the active lender percentage can be divided into the percentage of lenders that have logged into the system 10 in the last seven days and the percentage of lenders 40 who have made their black dot calls this week.

Planning Model Tool

Figure 15:
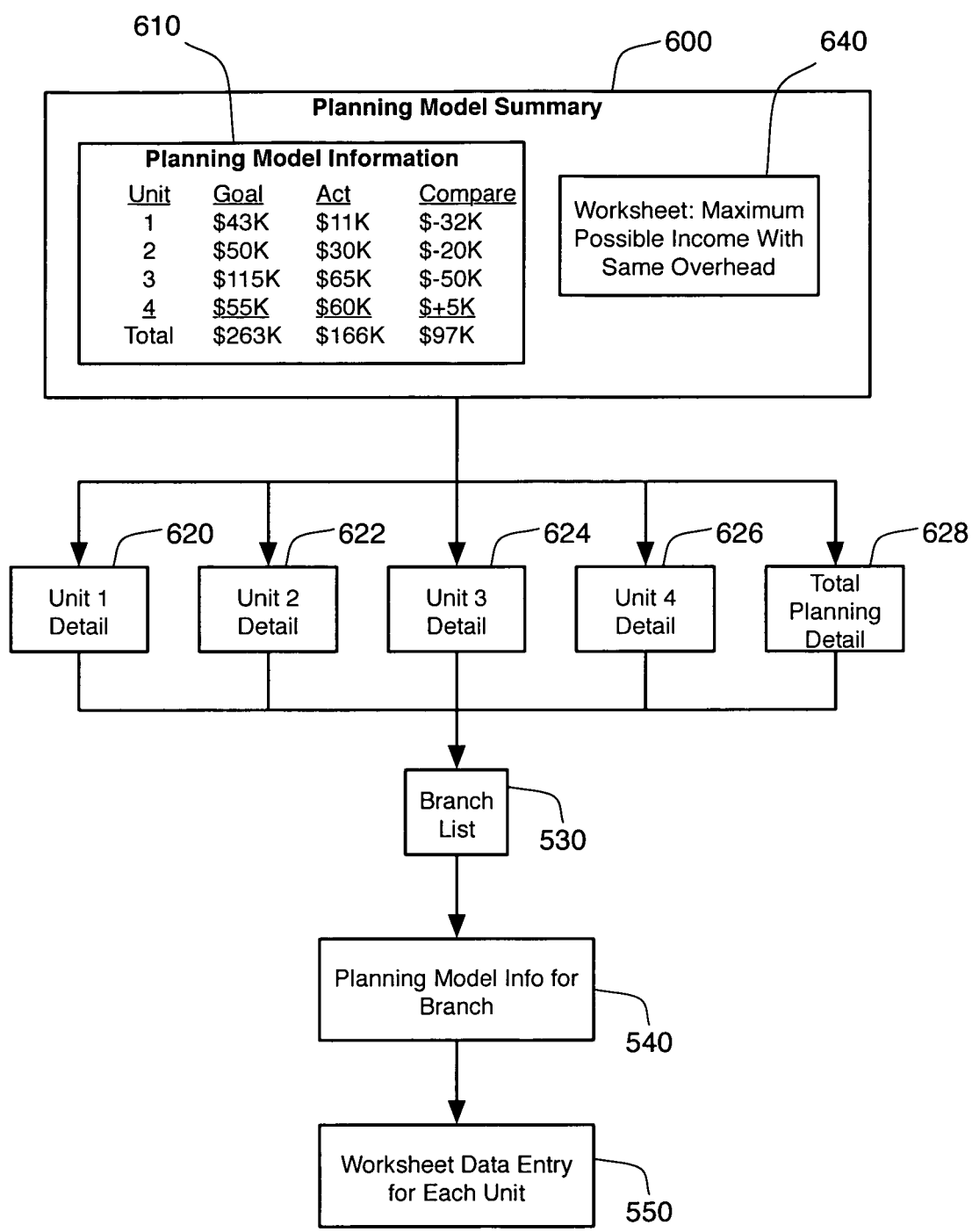
FIG. 15 is a block diagram of the planning model tool interface found in the management interface of FIG. 11.

The planning model tool 600 is shown in more detail in connection with FIG. 15. This tool 600 can provide an overview 610 for the manager of their goals as set forth in the business plan 350, including their actual performance in these areas and how their actual performance compares to their goals. This information is presented originally in summary fashion, such as in the dollar value totals for each unit 360-390 shown in FIG. 15. More detailed information is presented in the detail pages 620-626, which describe the goals and actual performance for each unit 360-390 of the plan 350. Each of these detail pages 620-626 contains information about the values shown in FIG. 10 that are relevant for the particular unit 360-390. A detail total planning page 628 contains all the information from the other detail pages 620-626 in a single page.

In the preferred embodiment, none of these detail pages 620-628 allow the manager to change the goals or other values that were entered when the business model 350 was created. To do that modification, the manager enters the worksheet data entry page 550 through the branch list 530, as explained in connection with FIG. 12. This is because all goal planning for the business model 350 is made on a branch 330 by branch 330 basis. Of course, it is well within the scope of the present invention to allow the manager to directly edit the numbers for a particular branch without having to pass through the branch list page 530. This would be accomplished by providing a mechanism to select a branch for editing from the detail pages 620-628.

The planning model tool 600 also includes a worksheet 640 that is designed to determine the maximum income available without increasing overhead expenses. The worksheet asks each branch manager to estimate the maximum number of closings in a time period that can be accomplished at the branch based on existing operations and costs. When this is compared with the current number of closings at the branch, the difference can be multiplied by the income to the institution per closed loan (item "C" in FIG. 10) to calculate the branch's shortfall from the maximum income amount available. In the preferred embodiment, this worksheet is presented to the manager on the main portion of planning model tool 600. Alternatively, this worksheet 640 can be accessible by a link from the planning model tool 600. Since this worksheet 640 forms part of the business plan 350, and is preferably completed before completing any of the individual units 360-390, it is shown in FIG. 10 above each of these units 360-390 as tool 355.

First Alternative Embodiment

Figure 16:
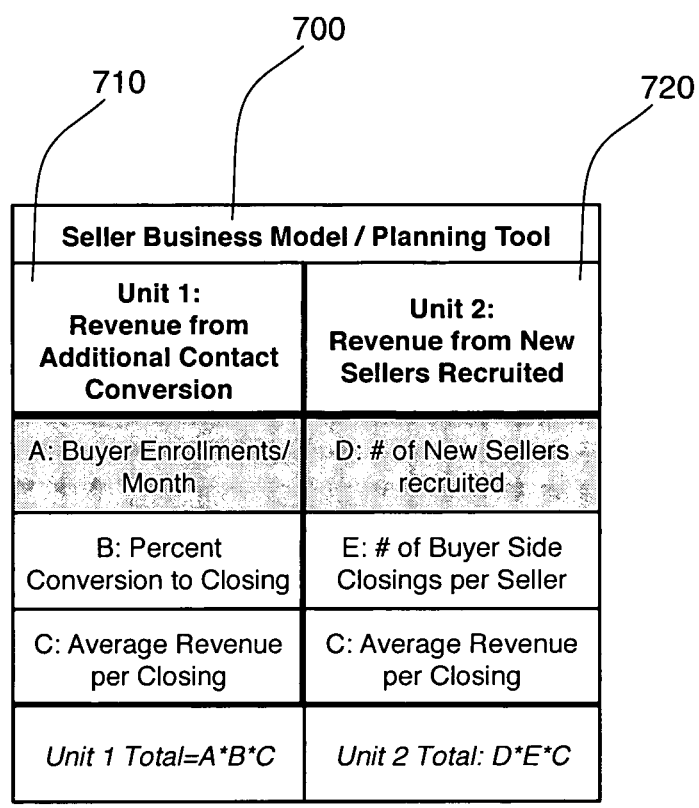
FIG. 16 is a table showing a business model planning tool for seller institutions used by a first alternative embodiment of the present invention.

The above description of the management page 400 describes how the present invention can be used by managers of a financial institution 300 to track their progress toward goals set forth in a business plan 350. In a first alternative embodiment to the present invention, a similar management page is provided for managers of sellers 30 that utilize the computerized system 10. Just as the financial institution management page 400 was based upon a business model 350, the seller management page is based on a seller-oriented business model 700 as shown in the table of FIG. 16.

The first unit 710 of this model 700 calculates the potential revenue to the seller institution due to additional contact conversions resulting from the use of the present invention system 10. The seller manager is requested to input a goal for the number of new buyer enrollments that will be made per month (value "A" in unit 710). This number can be input as a single number for an entire seller institution branch, or can be based upon a per-seller number that is then multiplied by the number of sellers at that branch. This number is then multiplied by a given percentage of enrolled buyers who typically close with the seller 30. The total of A times B is then multiplied by the average revenue per closing for the branch ("C") to determine the total additional revenue for Unit 1.

The second unit 720 of model 700 calculates the revenue that can be obtained by a seller organization by recruiting new sellers 30. Since access to the system 10 is a valuable recruiting tool, this unit lets the seller manager place a dollar value on this benefit. Item "D" is the goal value for the number of new sellers that will be recruited. This number is then multiplied by the number of buyer side closings typically expected per seller ("E") and the average revenue to the seller institution per closing ("C") to obtain an revenue value for the second unit 720.

As was the case with the Lender business model 350, the seller business model has goal values in each unit 710, 720 that can be compared over time to actual values. These goals are the values "A" and "D," which are shaded in FIG. 16. The system can track performance of various levels of hierarchy in the seller institution as compared to these goals, and can show this comparison as numbers or as dollar values calculated as set forth in business model 700.

The management page for managers in seller institutions is very similar to the management page 400 described above for managers of financial institutions 300. The planning model summary 600 would show the various elements of the seller business model 700, but would otherwise be the same as described above for the financial institution business model 350. The contact prompts described in connection with section 440 above could be similarly arranged for the manager of a seller institution. As for the loan officer recruiting information 420, the seller manager page would set forth seller-recruiting information. The organizational chart 500, lists 510, 520, and reports 560 presented to the financial institution manager would also be useful for the seller manager. However, it is likely that information about lenders 40 would be excluded, leaving only information about the seller institution hierarchy, individual sellers 30, and buyers 20.

In this way, the present invention could provide management level information to managers of both financial institutions 300 and seller institutions. This ability greatly increases the usefulness of the computerized system 10.

Second Alternative Embodiment

Figure 17:
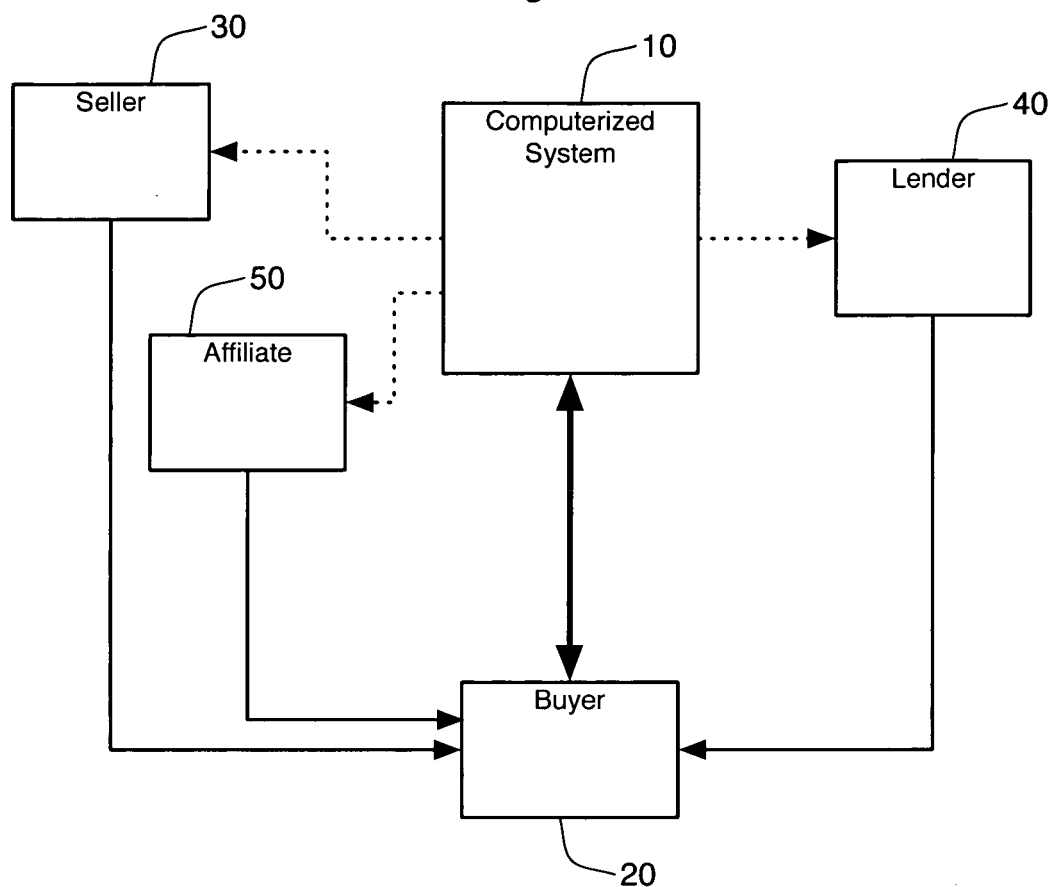
FIG. 17 is a second alternative embodiment of the present invention incorporating affiliates in addition to buyers, sellers, and lenders.

FIG. 17 shows a second alternative embodiment, in which the three main parties using the system, namely the buyer 20, seller 30, and lender 40, are joined by a fourth party, namely an affiliate 50. An affiliate can be any party that may be of use to the buyer 20 in addition to the seller 30 and lender 40. In the preferred embodiment, the affiliate is not another seller 30 or lender 40.

In this embodiment, the affiliate is prompted by the computerized system 10 to contact the buyer 20 much like the seller 30 and lender 40 are prompted. The above-described embodiment evenly distributed prompts for contacting the buyer 20 between the seller 30 and lender 40. However, this type of even distribution is not necessary with every embodiment. For instance, in this second alternative embodiment, the system 10 could be programmed to prompt the lender 40 to make every other contact, while the seller 30 and affiliate 50 split the remaining contacts. For instance, the system could first prompt the lender 40 to make the contact, then the seller 30, then the lender 40 again, and then the affiliate 50, with this pattern repeating indefinitely.

In terms of the interface of the affiliate 50 with the system 10, the interface could be the same type of interface and main page 160 as that provided for the seller 160. Affiliates 50 would be associated with particular buyers 20, and could access information about the buyers 20 through a buyer's list 168. In this embodiment, all parties 30, 40, and 50 would keep and share notes about the buyer 20. In addition, the buyer's page 200 now includes information about the affiliate 50 as well as the seller information 212 and lender information 214 described above.

It would not be necessary for every buyer 20 to be associated with a seller 30, a lender 40, and an affiliate 50 in this second alternative embodiment. One of the primary purposes of the present invention is to share information where permission has been granted about buyers and share a contact management system between at least two parties. Thus, all that would be required for the present invention to be useful is to have a buyer 20 associate with two of the three parties 30, 40, or 50. However, it would be preferred for one of the two parties to always be the lender 40.

The present invention has now been described with reference to several embodiments. The foregoing detailed description and examples have been given for clarity of understanding only. Those skilled in the art will recognize that many changes can be made in the described embodiments without departing from the scope and spirit of the invention. Thus, the scope of the present invention should not be limited to the exact details and structures described herein, but rather by the appended claims and equivalents.

What is claimed is:

1. A computerized method for evaluating use of a real estate data sharing system comprising:
   a) generating, at a server computer, a business plan for each of a plurality of organizational units of a lender institution for a predetermined time period, wherein the business plan is comprised of revenue-generating portions and wherein the generating comprises:
      i) calculating a first estimated revenue portion of the business plan based on an estimated increase in revenue to a respective organization unit of the lender institution as a result of increased loan closings generated by existing and new real estate agents as a result of the real estate data sharing system being employed by the lender institution;
      ii) calculating a second estimated revenue portion based on an estimated number of new loan officers that will work with the respective organizational unit of the lender institution as the result of the real estate data sharing system being employed by the lender institution;
      iii) summing the first and second estimated revenue portions, wherein each of the first and second estimated revenue portions represents a goal of the respective organizational unit;
   b) tracking, at the server computer, actual revenue generated for each of the plurality of organizational units during the predetermined time period for each portion of the business plan;
   c) aggregating, at the server computer, the business plans and actual revenue generated for a set of organizational units according to a hierarchical structure of the lender institution, thereby generating an aggregated business plan and an aggregated actual revenue for the set of organizational units; and
   d) presenting, by the server computer, a manager interface displaying a comparison of the aggregated business plan and the aggregated actual revenue generated for the set of organizational units, wherein the comparison comprises at least a display of each portion of the aggregated business plan and the aggregated actual revenue.

2. The computerized method of claim 1, wherein the generating step further comprises calculating an estimated maximum available income for the respective organizational unit of the lender institution based on an estimated maximum number of closings in the predetermined time period that can be accomplished at the respective organizational unit of the lender institution without increasing overhead expenses.

3. The computerized method of claim 2, wherein the manager interface separately displays actual revenue relative to the first and second estimated revenue portion for each organizational unit in the set of organizational units.

4. The computerized method of claim 1, wherein the first estimated revenue portion relates to hot closings that do not assume that the existing and new real estate agents will increase a number of home sales that are closed per agent.

5. The computerized method of claim 4, wherein the generating step further comprises calculating a third estimated revenue portion for increased closings brought to the respective organizational unit of the lender institutions as a result of the existing and new real estate agents increasing the number of home sales that are closed per agent as the result of the real estate data sharing system being employed.

6. The computerized method of claim 5 wherein the generating step further comprises calculating an estimated maximum available income for the respective organizational unit of the lender institution based on an estimated maximum number of closings in the predetermined time period that can be accomplished at the respective organizational unit of the lender institution without increasing overhead expenses.

7. The computerized method of claim 6, wherein the manager interface separately displays actual revenue relative to the first and second estimated revenue portion for each organizational unit in the set of organizational units.

8. The computerized method of claim 6, wherein the generating step further comprises identifying a goal for a desired number of new real estate agents that started working with the respective organizational unit of the lender institution as the result of the real estate data sharing system being employed by the lender institution, further wherein the manager interface displays how the goal for the desired number of new real estate agent compares to real world numbers.

9. The computerized method of claim 8, wherein the generating step further comprises identifying a goal for a desired number of new loan officer hires at the respective organizational unit of the lender institution as the result of the real estate data sharing system being employed by the lender institution, further wherein the manager interface displays how the goal for the desired number of new loan officer hires compares to real world numbers.

10. A computer system comprising:
   a) a processor that operates according to programming instructions;
   b) a tangible computer readable medium containing the programming instructions for controlling the processor, the programming instructions causing the processor to:
      i) generate a business plan for each of a plurality of organizational units of a lender institution for a predetermined time period, wherein the business plan is comprised of revenue-generating portions and wherein the business plan comprises:
         (1) a first estimated revenue portion based on an estimated increase in revenue to respective organization unit of the lender institution as a result of increased loan closings generated by existing and new real estate agents as a result of the real estate data sharing system being employed by the lender institution;
         (2) a second estimated revenue portion based on an estimated number of new loan officers that will work with the respective organization unit of the lender institution as the result of the real estate data sharing system being employed by the lender institution;
         (3) a sum of the first and second estimated revenue portions, wherein each of the first and second estimated revenue portions represents a goal of the respective organizational unit;
      ii) track actual revenue generated for each of the plurality of organizational units during the predetermined time period for each portion of the business plan;
      iii) aggregate the business plans and actual revenue generated for a set of organizational units according to a hierarchical structure of the lender institution, thereby generating an aggregated business plan and an aggregated actual revenue for the set of organizational units; and
      iv) present a manager interface displaying a comparison of the aggregated business plan and the aggregated actual revenue generated for the set of organizational units, wherein the comparison comprises at least a display of each portion of the aggregated business plan and the aggregated actual revenue.

11. The computer system of claim 10, wherein the business plan further comprises:
   (4) a tool to determine estimated maximum available income for the respective organizational unit of the lender institution based on an estimated maximum number of closings in the predetermined time period that can be accomplished at the respective organizational unit of the lender institution without increasing overhead expenses.

12. The computer system of claim 10, wherein the first estimated revenue portion relates to hot closings that do not assume that the existing and new real estate agents will increase a number of home sales that are closed per agent.

13. The computer system of claim 12, wherein the business plan further comprises:
   (4) a third estimated revenue portion for increased closings brought to the respective organizational unit of the lender institutions as a result of the existing and new real estate agents increasing the number of home sales that are closed per agent as the result of the real estate data sharing system being employed.

14. The computer system of claim 10, wherein the business plan further comprises identifying a goal for a desired number of new real estate agents that started working with the respective organizational unit of the lender institution as the result of the real estate data sharing system being employed by the lender institution, further wherein the manager interface displays how the goal for the desired number of new real estate agent compares to real world numbers.

15. The computer system of claim 14, wherein the business plan further comprises identifying a goal for a desired number of new loan officer hires at the respective organizational unit of the lender institution as the result of the real estate data sharing system being employed by the lender institution, further wherein the manager interface displays how the goal for the desired number of new loan officer hires compares to real world numbers.

* * * * *